US012619115B2

(12) United States Patent
Kurokawa et al.

(10) Patent No.: US 12,619,115 B2
(45) Date of Patent: May 5, 2026

(54) OPTICAL ELEMENT

(71) Applicant: Japan Display Inc., Tokyo (JP)

(72) Inventors: Tae Kurokawa, Tokyo (JP); Takeo Koito, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 147 days.

(21) Appl. No.: 18/739,440

(22) Filed: Jun. 11, 2024

(65) Prior Publication Data

US 2024/0337883 A1      Oct. 10, 2024

Related U.S. Application Data

(63) Continuation of application No. 18/222,154, filed on Jul. 14, 2023, now Pat. No. 12,038,655, which is a continuation of application No. PCT/JP2021/046386, filed on Dec. 15, 2021.

(30) Foreign Application Priority Data

Feb. 18, 2021 (JP) ................................. 2021-024714

(51) Int. Cl.
$G02F\ 1/1343$ (2006.01)
$G02F\ 1/1347$ (2006.01)

(52) U.S. Cl.
CPC ........ $G02F\ 1/13439$ (2013.01); $G02F\ 1/1347$ (2013.01)

(58) Field of Classification Search
None
See application file for complete search history.

(56) References Cited

U.S. PATENT DOCUMENTS

| | | | | |
|---|---|---|---|---|
| 2009/0147186 A1* | 6/2009 | Nakai | ................. | G02F 1/13471 345/89 |
| 2009/0273743 A1 | 11/2009 | Sawabe et al. | | |
| 2010/0091231 A1* | 4/2010 | Nishimura | ........ | G02F 1/134363 349/139 |
| 2010/0149444 A1* | 6/2010 | Hikmet | ............. | G02F 1/134363 349/122 |
| 2018/0164622 A1* | 6/2018 | Ono | ................. | G02F 1/136286 |
| 2018/0196318 A1* | 7/2018 | Presniakov | ....... | G02F 1/134363 |
| 2019/0212615 A1* | 7/2019 | Tomotoshi | ........ | G02F 1/134309 |

(Continued)

OTHER PUBLICATIONS

Extended European Search Report dated Dec. 19, 2024 issued in related European Patent Application No. 21926785.3. 8 pages.

(Continued)

*Primary Examiner* — Ryan Crockett
(74) *Attorney, Agent, or Firm* — K&L Gates LLP

(57) ABSTRACT

An optical element includes at least two liquid crystal cells. The at least two liquid crystal cells include a first substrate on which a first transparent electrode and a second transparent electrode are alternately and repeatedly arranged in a first direction, a second substrate on which a third transparent electrode and a fourth transparent electrode are alternately and repeatedly arranged in a second direction intersecting the first direction, and a liquid crystal layer between the first substrate and the second substrate. The second transparent electrode comprises a first bent portion bent in the first direction. The fourth transparent electrode comprises a second bent portion bent in the second direction.

18 Claims, 18 Drawing Sheets

(56)                    References Cited

U.S. PATENT DOCUMENTS

| 2022/0187647 A1* | 6/2022 | Nagasawa | G02F 1/1347 |
| 2023/0418108 A1* | 12/2023 | Ikeda | G02F 1/1347 |
| 2023/0418119 A1* | 12/2023 | Ikeda | G02F 1/13439 |
| 2024/0004243 A1* | 1/2024 | Koito | G02F 1/1347 |
| 2024/0045276 A1* | 2/2024 | Koito | G02F 1/1343 |
| 2024/0248334 A1* | 7/2024 | Wang | G02F 1/133 |

OTHER PUBLICATIONS

1 English machine translation of Office Action dated Jul. 22, 2025 issued in CN Appl. No. 202180093196.1. 7 pages.

* cited by examiner

OPTICAL ELEMENT

CROSS-REFERENCE TO RELATED APPLICATIONS

This application is a continuation of U.S. application Ser. No. 18/222,154, filed on Jul. 14, 2023, which application is a continuation of International Patent Application No. PCT/JP2021/046386, filed on Dec. 15, 2021, which claims the benefit of priority to Japanese Patent Application No. 2021-024714, filed on Feb. 18, 2021, the entire contents of which are incorporated herein by reference.

FIELD

An embodiment of the present invention relates to an optical element using a liquid crystal.

BACKGROUND

An optical element which is a so-called liquid crystal lens has been conventionally known in which a change in the refractive index of a liquid crystal is utilized by adjusting a voltage applied to the liquid crystal. Further, a lighting device using a light source and a liquid crystal lens has been developed (for example, see Japanese laid-open patent publication No. 2005-317879, 2010-230887, or 2014-160277).

SUMMARY

An optical element includes at least two liquid crystal cells. The at least two liquid crystal cells include a first substrate on which a first transparent electrode and a second transparent electrode are alternately and repeatedly arranged in a first direction, a second substrate on which a third transparent electrode and a fourth transparent electrode are alternately and repeatedly arranged in a second direction intersecting the first direction, and a liquid crystal layer between the first substrate and the second substrate. The second transparent electrode comprises a first bent portion bent in the first direction. The fourth transparent electrode comprises a second bent portion bent in the second direction.

BRIEF DESCRIPTION OF DRAWINGS

FIG. 7 is a graph showing front relative luminance versus d/p in a liquid crystal cell of an optical element according to an embodiment of the present invention.

FIG. 14 is a schematic diagram illustrating an arrangement in a stacked structure of a first transparent electrode and a second transparent electrode of a first liquid crystal cell and a first transparent electrode and a second transparent electrode of a second liquid crystal cell in an optical element according to an embodiment of the present invention.

DESCRIPTION OF EMBODIMENTS

Figure 1:
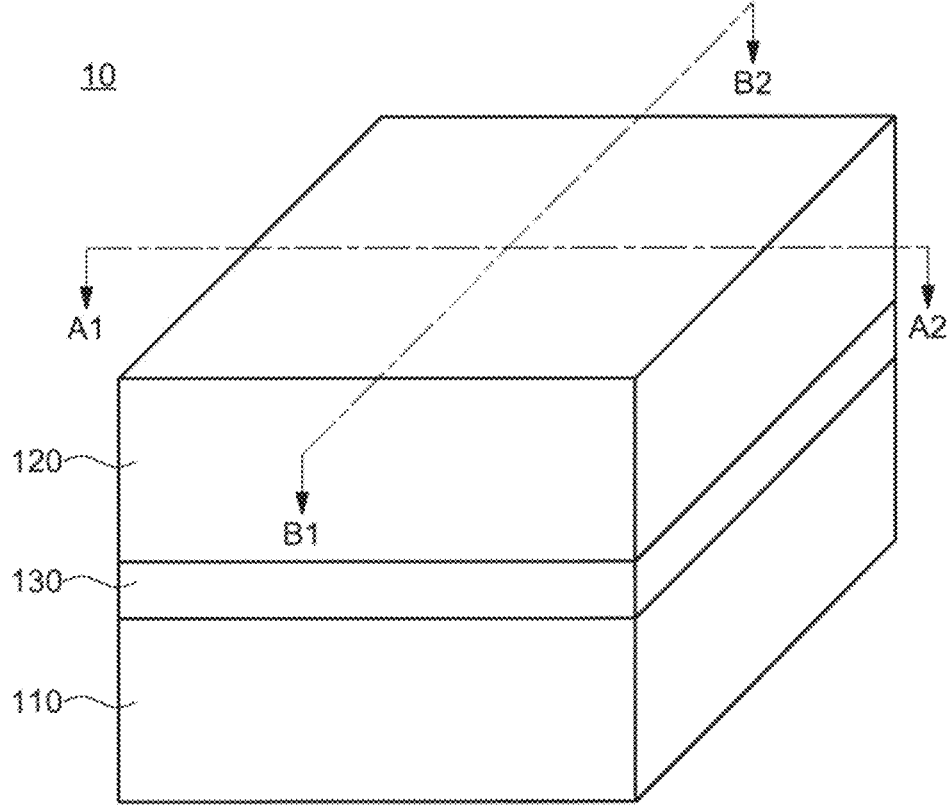
FIG. 1 is a schematic perspective view of an optical element according to an embodiment of the present invention.
Figure 1:
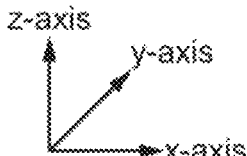

In the case where liquid crystal cells constituting a liquid crystal lens are stacked, when a shape and arrangement of electrodes for applying a potential to a liquid crystal have the same configuration, a distribution of a direction in which light is refracted becomes identical, so that moire due to light interference or coloration due to wavelength dependence of the refractive index may occur, depending on the stacked order of the liquid crystal cells. In the case of linear electrodes provided in parallel, although a structure is proposed in which the electrodes are formed so that the distance between the electrodes is different, it is difficult for the liquid crystal in the liquid crystal cell to align when a distance between the electrodes is too large. Thus, a light diffusion performance (that is, a light distribution) may be reduced.

In view of the above problem, one object of an embodiment of the present invention is to provide an optical element capable of sufficiently controlling a light distribution while reducing moire.

Hereinafter, each of the embodiments of the present invention is described with reference to the drawings. However, the present invention can be implemented in various modes without departing from the gist of the invention and should not be interpreted as being limited to the description of the embodiments exemplified below.

Although the drawings may be schematically represented in terms of width, thickness, shape, and the like of each part as compared with their actual mode in order to make explanation clearer, they are only an example and an interpretation of the present invention is not limited. In addition, in the drawings, the same reference numerals are provided to the same elements as those described previously with reference to preceding figures and repeated explanations may be omitted accordingly.

In the case when a single film is processed to form a plurality of structural bodies, each structural body may have different functions and roles, and the bases formed beneath each structural body may also be different. However, the plurality of structural bodies is derived from films formed in the same layer by the same process and have the same material. Therefore, the plurality of these films is defined as existing in the same layer.

When expressing a mode in which another structure is arranged over a certain structure, in the case where it is simply described as "over", unless otherwise noted, a case where another structure is arranged directly over a certain structure as if in contact with that structure, and a case where another structure is arranged via another structure over a certain structure, are both included.

First Embodiment

An optical element 10 according to an embodiment of the present invention is described with reference to FIGS. 1 to 7.

[1. Configuration of Optical Element]

FIG. 1 is a schematic perspective view of an optical element 10 according to an embodiment of the present invention. As shown in FIG. 1, the optical element 10 includes a first liquid crystal cell 110, a second liquid crystal cell 120, and an optical elastic resin layer 130. The optical elastic resin layer 130 is provided between the first liquid crystal cell 110 and the second liquid crystal cell 120. That is, the first liquid crystal cell 110 and the second liquid crystal cell 120 are stacked in a z-axis direction with the optical elastic resin layer 130 interposed therebetween.

The optical elastic resin layer 130 can adhere and fix the first liquid crystal cell 110 and the second liquid crystal cell 120. For example, an adhesive containing an optical elastic resin such as a translucent acrylic resin can be used for the optical elastic resin layer 130.

Figure 2A:
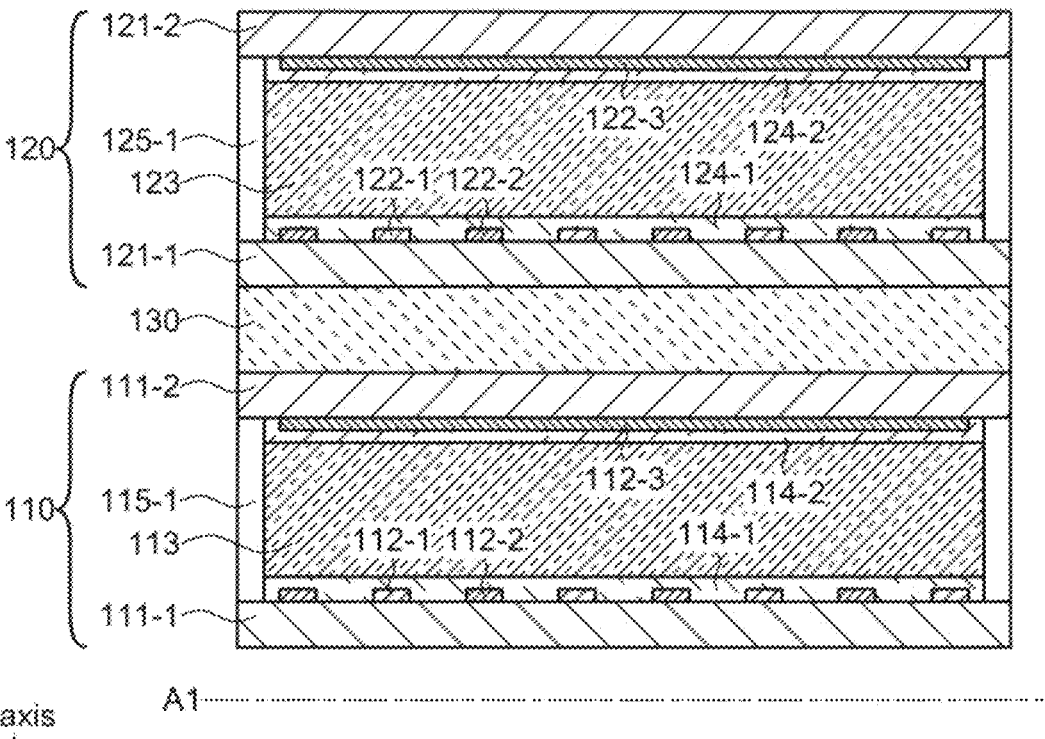
FIG. 2A is a schematic cross-sectional view of an optical element according to an embodiment of the present invention.
Figure 2A:
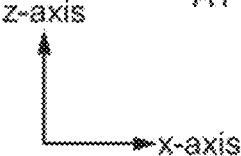
Figure 2B:
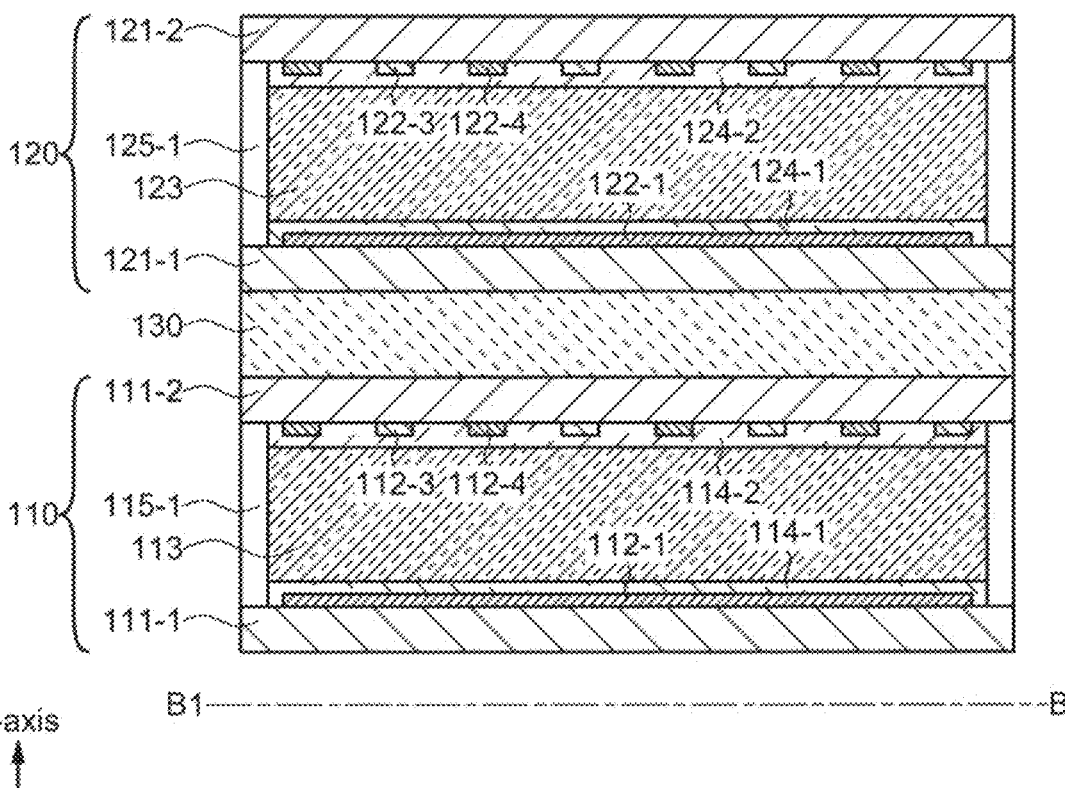
FIG. 2B is a schematic cross-sectional view of an optical element according to an embodiment of the present invention.

FIGS. 2A and 2B are schematic cross-sectional views of an optical element according to an embodiment of the present invention. Specifically, FIG. 2A is a schematic cross-sectional view in a z-x plane cut along a line A1-A2 shown in FIG. 1, and FIG. 2B is a schematic cross-sectional view in a y-z plane cut along a line B1-B2 shown in FIG. 1. In addition, hereinafter, the x-axis direction and the y-axis direction may be described as the first direction and the second direction, respectively.

The first liquid crystal cell 110 includes a first substrate 111-1, a second substrate 111-2, a first transparent electrode 112-1, a second transparent electrode 112-2, a third transparent electrode 112-3, a fourth transparent electrode 112-4, a liquid crystal layer 113, a first alignment film 114-1, a second alignment film 114-2, and a sealing member 115. The second liquid crystal cell 120 includes a first substrate 121-1, a second substrate 121-2, a first transparent electrode 122-1, a second transparent electrode 122-2, a third transparent electrode 122-3, a fourth transparent electrode 122-4, a liquid crystal layer 123, a first alignment film 124-1, a second alignment film 124-2, and a sealing member 125.

Although the optical element 10 including the two liquid crystal cells (the first liquid crystal 110 and the second liquid crystal cell 120) is shown in FIG. 1, the number of the liquid crystal cells included in the optical element 10 is not limited to two. At least two liquid crystal cells should be included in the optical element 10. Further, although it is not necessary that a plurality of the liquid crystal cells of the optical element 10 has the same structure and is stacked in the same direction, it is described that the first liquid crystal cell 110 and the second liquid crystal cell 120 are the same structure and are stacked in the same direction, for convenience. Therefore, only a configuration of the first liquid crystal cell 110 is described later, and the description of a configuration of the second liquid crystal cell 120 may be omitted, for convenience.

The first transparent electrode 112-1 and the second transparent electrode 112-2 are provided on the first substrate 111-1. Each of the first transparent electrode 112-1 and the second transparent electrode 112-2 extends in the y-axis direction, and the first transparent electrode 112-1 and the second transparent electrode 112-2 are alternatively and repeatedly arranged in the x-axis direction. In other words, the first transparent electrodes 112-1 and the second transparent electrodes 112-2 are formed in a comb shape on the first substrate 111-1. Further, the first alignment film 114-1 is provided on the first substrate 111-1 to cover the first transparent electrode 112-1 and the second transparent electrode 112-2.

The third transparent electrode 112-3 and the fourth transparent electrode 112-4 are provided on the second substrate 111-2. Each of the third transparent electrode 112-3 and the fourth transparent electrode 112-4 extends in the x-axis direction, and the third transparent electrode 112-3 and the fourth transparent electrode 112-4 are alternatively and repeatedly arranged in the y-axis direction. In other words, the third transparent electrodes 112-3 and the fourth transparent electrodes 112-4 are formed in a comb shape on the second substrate 111-2. Further, the second alignment film 114-2 is provided on the second substrate 111-2 to cover the third transparent electrode 112-3 and the fourth transparent electrode 112-4.

The first substrate 111-1 and the second substrate 111-2 are arranged so that the first transparent electrode 112-1 and the second transparent electrode 112-2 on the first substrate 111-1 face the third transparent electrode 112-3 and the fourth transparent electrode 112-4 on the second substrate 111-2. Therefore, the extending direction of the first transparent electrode 112-1 and the second transparent electrode 112-2 and the extending direction of the third transparent electrode 112-3 and the fourth transparent direction 112-4 intersect. In addition, the extending direction of the first transparent electrode 112-1 and the second transparent electrode 112-2 and the extending direction of the third transparent electrode 112-3 and the fourth transparent direction 112-4 are orthogonal to each other. Further, the sealing member 115 is arranged around the periphery of each of the first substrate 111-1 and the second substrate 111-2. That is, the first substrate 111-1 and the second substrate 111-2 are bonded together with the sealing member 115 interposed therebetween. Furthermore, a liquid crystal is enclosed in a space surrounded by the first substrate 111-1 (more specifically, the first alignment film 114-1), the second substrate 111-2 (more specifically, the second alignment film 114-2), and the sealing material 115, and the liquid crystal layer 113 is formed. In addition, the first substrate 111-1 and the second substrate 111-2, on which spacers are scattered or photospacers are formed, may be attached to each other. In that case, the photospacers can maintain the gap of the liquid crystal layer 113.

For example, a transparent rigid substrate such as a glass substrate, a quartz substrate, or a sapphire substrate is used as the first substrate 111-1 and the second substrate 111-2. Further, a configuration in which a flexible substrate having translucency such as a polyimide resin substrate, an acrylic resin substrate, a siloxane resin substrate, or a fluorine resin substrate is used as the first substrate 111-1 and the second substrate 111-2, for example, can also be adopted.

Each of the first transparent electrode 112-1, the second transparent electrode 112-2, the third transparent electrode 112-3, and the fourth transparent electrode 112-4 function as electrodes for forming an electric field in the liquid crystal layer 113. For example, a transparent conductive material such as indium tin oxide (ITO) or indium zinc oxide (IZO) is used for each of the first transparent electrode 112-1, the second transparent electrode 112-2, the third transparent electrode 112-3, and the fourth transparent electrode 112-4.

The liquid crystal layer 113 can refract transmitted light or change the polarization state of transmitted light according to the alignment state of the liquid crystal molecules. For example, nematic liquid crystal can be used as the liquid crystal of the liquid crystal layer 113. Although a positive liquid crystal is adopted in the embodiment, it is also possible to adopt a configuration of a negative liquid crystal by changing the initial alignment direction of the liquid crystal molecules. Further, the liquid crystal preferably contains a chiral agent that imparts twist to the liquid crystal molecules.

Each of the first alignment film 114-1 and the second alignment film 114-2 aligns the liquid crystal molecules in the liquid crystal layer 113 in a predetermined direction. For example, a polyimide resin or the like can be used for each of the first alignment film 114-1 and the second alignment film 114-2. In addition, each of the first alignment film 114-1 and the second alignment film 114-2 may be imparted with alignment properties by an alignment treatment such as a rubbing method or a photo-alignment method. The rubbing method is a method of rubbing the surface of the alignment film in one direction. The photo-alignment method is a method of irradiating an alignment film with linearly polarized ultraviolet rays.

The sealing member 115 adheres and fixes the first substrate 111-1 and the second substrate 111-2. For example, an epoxy resin adhesive, an acrylic resin adhesive, or the like can be used for the sealing member 115. The adhesive may be of an ultraviolet curable type or a heat curable type.

The optical element 10 includes at least the two liquid crystal cells (the first liquid crystal cell 110 and the second liquid crystal cell 120), so that the light distribution of unpolarized light can be controlled. Therefore, it is not necessary to provide a pair of polarizing plates on the outer surface of each substrate, which are provided on the front and rear surfaces of a liquid crystal display element, for example. Further, in the first liquid crystal cell 110, different potentials are applied to the first transparent electrode 112-1, the second transparent electrode 112-2, the third transparent electrode 112-3, and the fourth transparent electrode 112-4, respectively, so that it is possible to control an alignment of the liquid crystal of the liquid crystal layer. The same configuration of the first liquid crystal cell 110 is adopted to the second liquid crystal cell 120.

[2. Control of Alignment of Liquid Crystal]

The alignment of the liquid crystal in the liquid crystal layer 113 is described in detail with reference to FIGS. 3A and 3B.

Figure 3A:
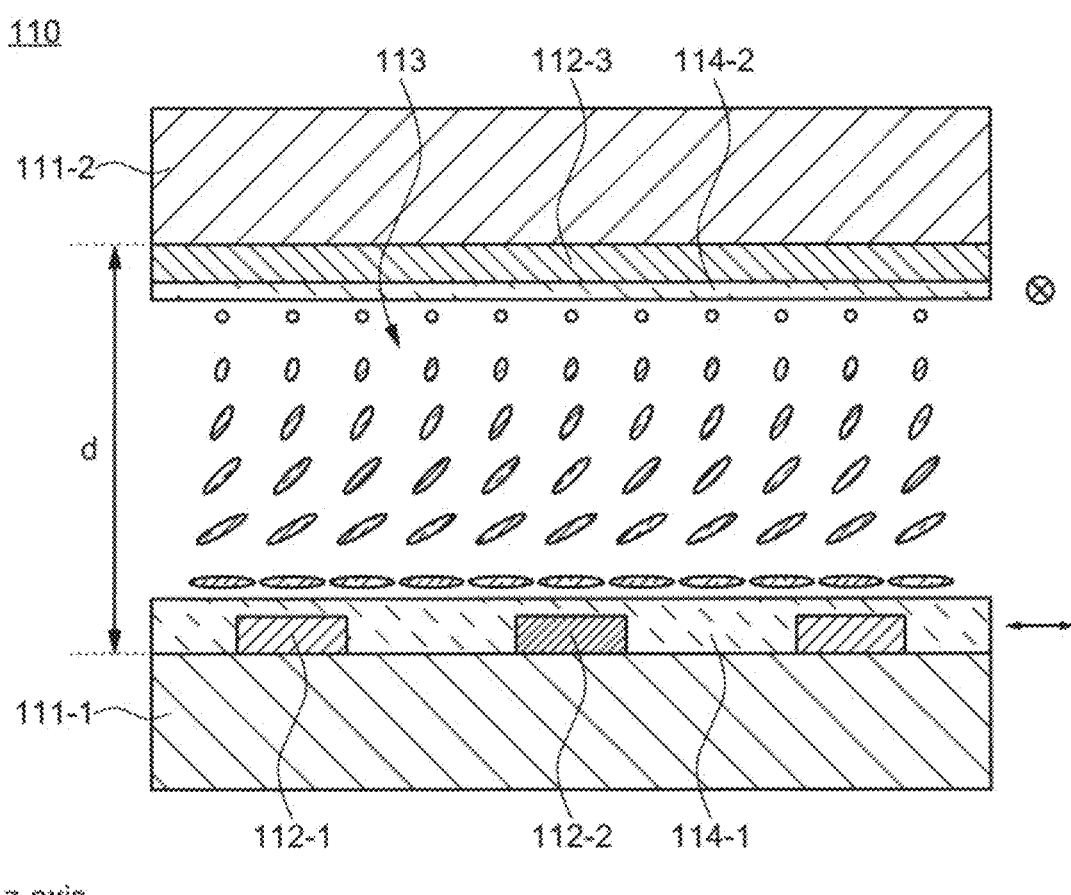
FIG. 3A is a schematic cross-sectional view showing an alignment of liquid crystal molecules in a liquid crystal layer in an optical element according to an embodiment of the present invention.
Figure 3A:
Figure 3B:
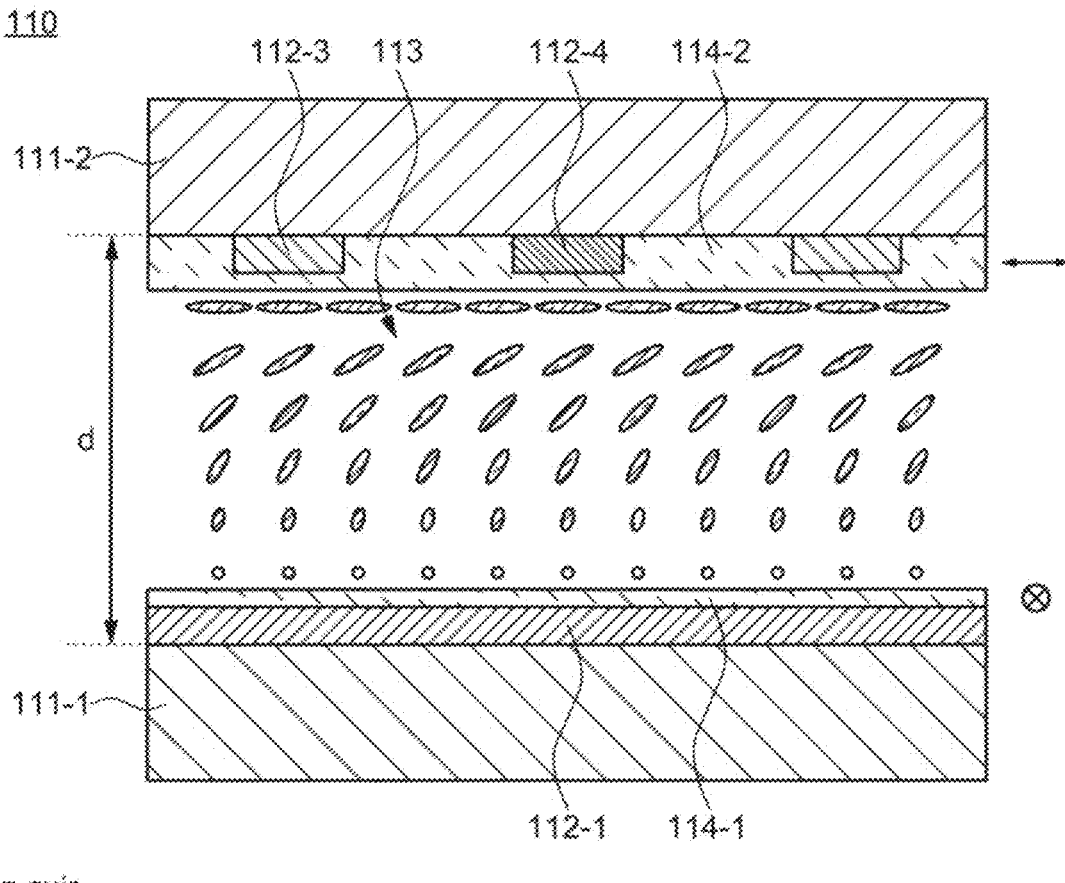
FIG. 3B is a schematic cross-sectional view showing an alignment of liquid crystal molecules in a liquid crystal layer in an optical element according to an embodiment of the present invention.
Figure 3B:
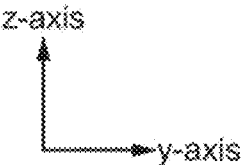

FIGS. 3A and 3B are schematic cross-sectional views showing an alignment of liquid crystal molecules in the liquid crystal layer 113 in the optical element 10 according to an embodiment of the present invention. FIGS. 3A and 3B correspond to a portion of the cross-sectional view of the first liquid crystal cell 110 shown in FIGS. 2A and 2B, respectively.

As shown in FIGS. 3A and 3B, the first substrate 111-1 and the second substrate 111-2 are bonded to each other with an inter-substrate distance d. The alignment treatments in the x-axis direction and y-axis direction are performed on the first alignment film 114-1 of the first substrate 111-1 and the second alignment film 114-2 of the second substrate 111-2, respectively. Therefore, in the liquid crystal layer 113, the long axes of the liquid crystal molecules on the side of the first substrate 111-1 are aligned along the x-axis direction when no potential is applied to the transparent electrodes (In FIGS. 4A and 4B, for convenience, the alignment direction of the liquid crystal molecules aligned in the horizontal direction of the paper is indicated by an arrow symbol). That is, the alignment direction of the liquid crystal molecules on the side of the first substrate 111-1 is orthogonal to the extending direction of the first transparent electrode 112-1 and the second transparent electrode 112-2. Further, the liquid crystal molecules on the side of the second substrate 111-2 side have the long axes aligned along the y-axis direction when no potential is applied to the transparent electrodes (In FIGS. 4A and 4B, for convenience, the alignment direction of the liquid crystal molecules aligned in the perpendicular direction of the paper is indicated by using a symbol with a cross in a circle). That is, the alignment direction of the liquid crystal molecules on the side of the second substrate 111-2 is orthogonal to the extending direction of the third transparent electrode 112-3 and the fourth transparent electrode 112-4. Therefore, the liquid crystal molecules of the liquid crystal layer 113 are aligned in a state twisted by 90 degrees from the first substrate 111-1 toward the second substrate 111-2 in the z-axis direction. More specifically, in FIG. 4A, the liquid crystal molecules on the side of the first substrate 111-1 are aligned with the long axes in the x-axis direction (horizontal direction on the paper surface) along the alignment direction of the first alignment film 114-1. Further, the liquid crystal molecules on the side of the second substrate 111-2 are aligned with the long axes in the y-axis direction (perpendicular direction on the paper surface) along the alignment direction of the second alignment film 114-2. Furthermore, the directions of the long axes from the x-axis direction to the y-axis direction of the liquid crystal molecules between the first substrate 111-1 and the second substrate 111-2 gradually change moving from the first substrate 111-1 to the second substrate 111-2.

Next, the alignment of the liquid crystal molecules in the liquid crystal layer 113 when potentials are applied is described in detail with reference to FIGS. 4A and 4B.

Figure 4A:
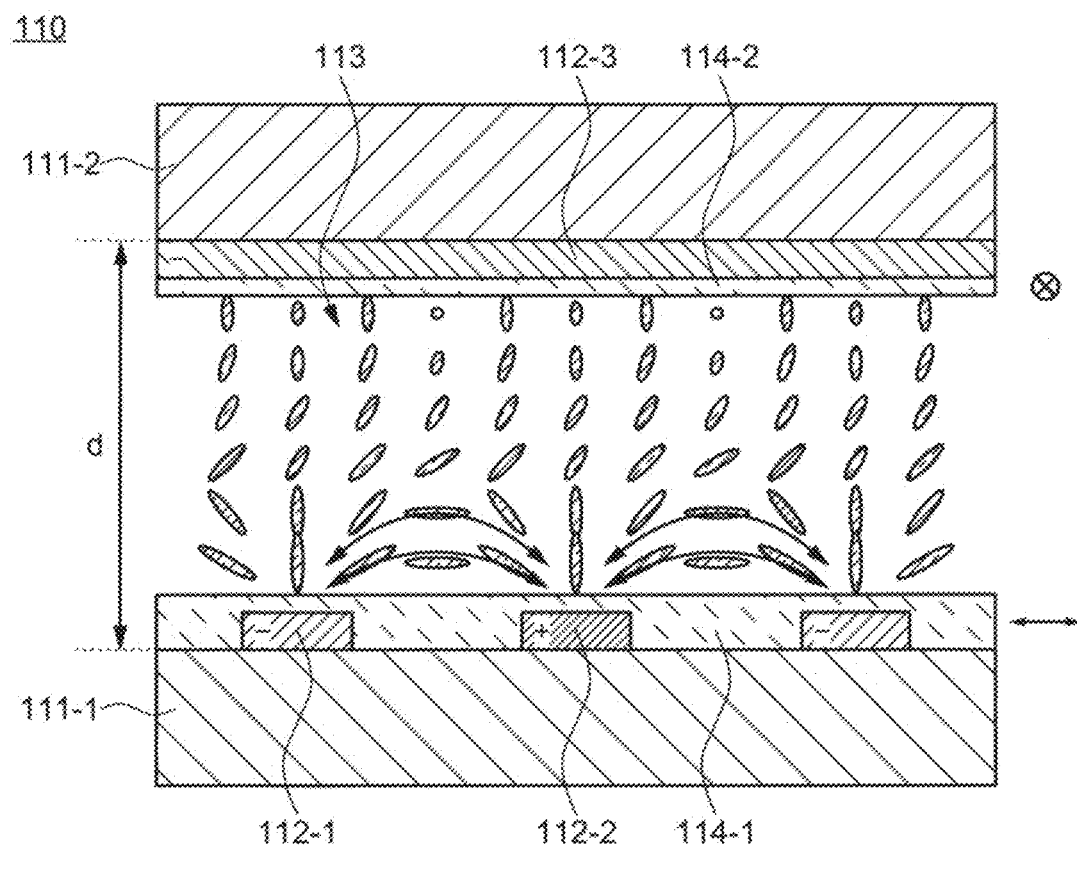
FIG. 4A is a schematic cross-sectional view showing an alignment of liquid crystal molecules in a liquid crystal layer when potentials are applied in an optical element according to an embodiment of the present invention.
Figure 4A:
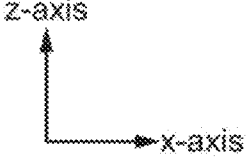
Figure 4B:
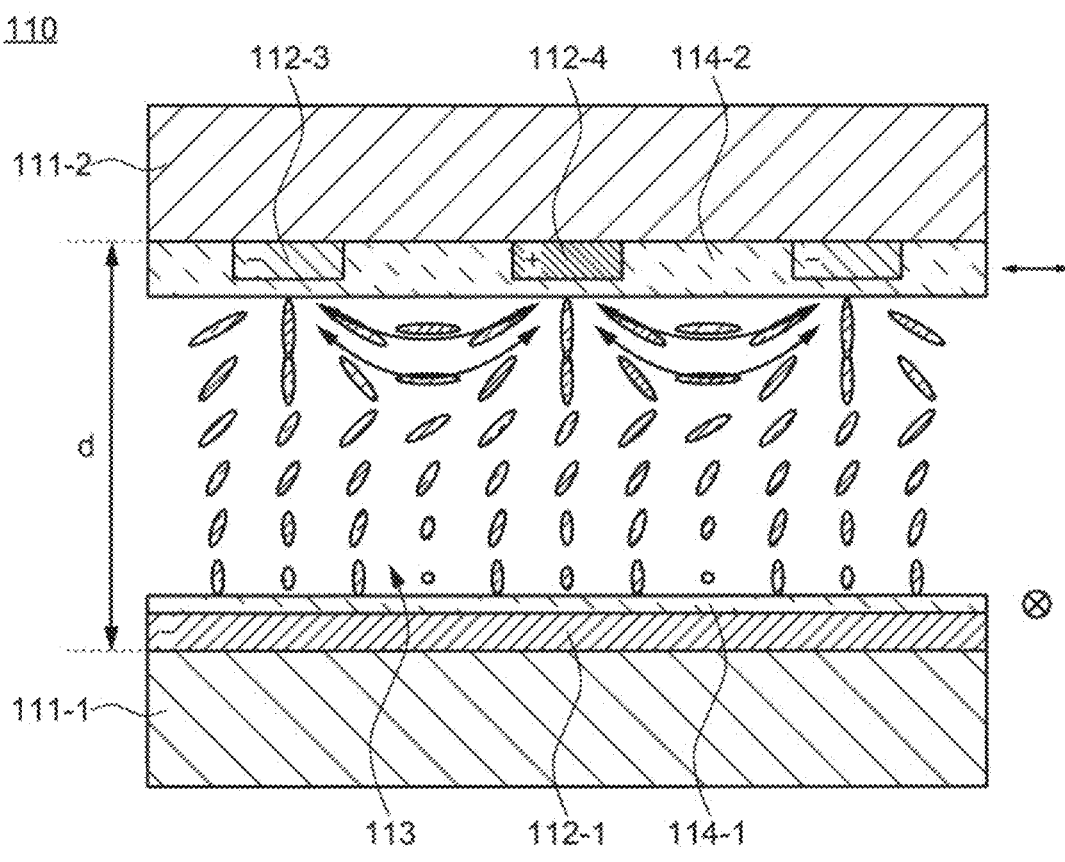
FIG. 4B is a schematic cross-sectional view showing an alignment of liquid crystal molecules in a liquid crystal layer when potentials are applied in an optical element according to an embodiment of the present invention.
Figure 4B:
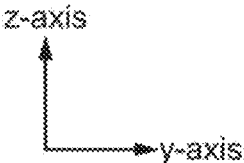

FIGS. 4A and 4B are schematic cross-sectional views showing an alignment of liquid crystal molecules in a liquid crystal layer 113 when potentials are applied in an optical element 10 according to an embodiment of the present invention. Further, in FIGS. 4A and 4B, the alignment directions of the first alignment film 114-1 and the second alignment film 114-2 are indicated by an arrow or a symbol of a cross in a circle, similar to FIGS. 3A and 3B.

In FIGS. 4A and 4B, a low potential is applied to the first transparent electrode 112-1 and the third transparent electrode 112-3, and a high potential is applied to the second transparent electrode 112-2 and the fourth transparent electrode 112-4 (In FIGS. 4A and 4B, for convenience, the low potential and the high potential are illustrated using symbols "−" and "+", respectively). That is, potential differences are generated between the first transparent electrode 112-1 and the second transparent electrode 112-2 and between the third transparent electrode 112-3 and the fourth transparent electrode 112-4. In this case, the liquid crystal molecules on the side of the first substrate 111-1 are aligned according to the electric field (potential distribution) generated between the first transparent electrode 112-1 and the second transparent electrode 112-2. That is, the long axes of the liquid crystal molecules on the side of the first substrate 111-1 are aligned along the direction from the first transparent electrode 112-1 to the second transparent electrode 112-2. Similarly, the liquid crystal molecules on the side of the second substrate 111-2 are aligned along the direction from the third transparent electrode 112-3 to the fourth transparent electrode 112-4. In addition, hereinafter, an electric field generated between adjacent transparent electrodes on the same substrate may be referred to as a lateral electric field.

Further, the alignments of the liquid crystal molecules are described in detail. Although the liquid crystal molecules on the side of the first substrate 111-1 are aligned in the x-axis direction in the absence of an electric field, the alignments of the liquid crystal molecules are the same as the direction of the lateral electric field between the first transparent electrode 112-1 and the second transparent electrode 112-2. Therefore, the alignments of the liquid crystal molecules located substantially in the center between the first transparent electrode 112-1 and the second transparent electrode 112-2 in a plan view hardly changes even by the lateral electric field. Further, the liquid crystal molecules closer to the first transparent electrode 112-1 or the second transparent electrode 112-2 than the center are aligned with a tilt in the z-axis direction corresponding to the lateral electric field. Therefore, as shown in FIG. 4A, the liquid crystal molecules on the side of the first substrate 111-1 are aligned as a whole in a convex arc shape from the first transparent electrode 112-1 to the second transparent electrode 112-2 as seen from the first substrate 111-1 for each of the adjacent transparent electrodes due to the influence of the lateral electric field between the first transparent electrode 112-1 and the second transparent electrode 112-2. Similarly, although the alignments of the liquid crystal molecules on the side of the second substrate 111-2 are aligned in the y-axis direction in the absence of an electric field, the alignments of the liquid crystal molecules are the same as the direction of the lateral electric field between the third transparent electrode 112-3 and the fourth transparent electrode 112-4. Therefore, the alignments of the liquid crystal molecules located substantially in the center between the third transparent electrode 112-3 and the fourth transparent electrode 112-4 in a plan view hardly changes even by the lateral electric field. Further, the liquid crystal molecules closer to the third transparent electrode 112-3 or the fourth transparent electrode 112-4 than the center are aligned with a tilt in the z-axis direction. Therefore, as shown in FIG. 4B, the liquid crystal molecules on the side of the second substrate 111-2 are aligned as a whole in a convex arc shape from the third transparent electrode 112-3 to the fourth transparent electrode 112-4 as seen from the second substrate 111-2 for each of the adjacent transparent electrodes due to the influence of the lateral electric field between the third transparent electrode 112-3 and the fourth transparent electrode 112-4. Accordingly, light incident on the liquid crystal layer 113 is diffused according to the refractive index distribution of the liquid crystal molecules aligned in a convex arc shape on the side of the first substrate 111-1 or the second substrate 111-2.

Since the first substrate 111-1 and the second substrate 111-2 are sufficiently far apart by the inter-substrate distance d, the lateral electric field between the first transparent electrode 112-1 and the second transparent electrode 112-2 of the first substrate 111-1 does not affect the alignments of the liquid crystal molecules on the side of the second substrate 111-2, or is negligibly small. Similarly, the lateral electric field between the third transparent electrode 112-3 and the fourth transparent electrode 112-4 of the second substrate 111-2 does not affect the alignments of the liquid crystal molecules on the side of the first substrate 111-1, or is negligibly small.

In the specification, the liquid crystal layer 113 (or the liquid crystal molecules) on the side of the first substrate 111-1 refers to the liquid crystal layer (or the liquid crystal molecules) within d/2 from the surface of the first substrate 111-1. Similarly, the liquid crystal layer 113 (or the liquid crystal molecules) on the side of the second substrate 111-2 refers to the liquid crystal layer (or the liquid crystal molecules) within d/2 from the surface of the second substrate 111-2.

In the first liquid crystal cell 110, the alignments of the liquid crystal molecules in the liquid crystal layer 113 can be changed by a potential applied to each of the first transparent electrode 112-1, the second transparent electrode 112-2, the third transparent electrode 112-3, and the fourth transparent electrode 112-4. The refractive index distribution of the liquid crystal layer 113 changes as the alignments of the liquid crystal molecules changes. Therefore, the first liquid crystal cell 110 can diffuse light transmitted through the first liquid crystal cell 110. The optical element 10 utilizes the changes in the refractive index distributions of the liquid crystal layer 113 of the first liquid crystal cell 110 and the liquid crystal layer 123 of the second liquid crystal cell 120, so that the light distribution of light transmitted through the optical element 10 can be controlled.

[3. Control of Light Distribution by Optical Element]

Control of the light distribution by the optical element 10 is described in detail with reference to FIGS. 5A and 5B.

Figure 5A:
FIG. 5A is a schematic cross-sectional view illustrating control of a light distribution by an optical element according to an embodiment of the present invention.
Figure 5A:
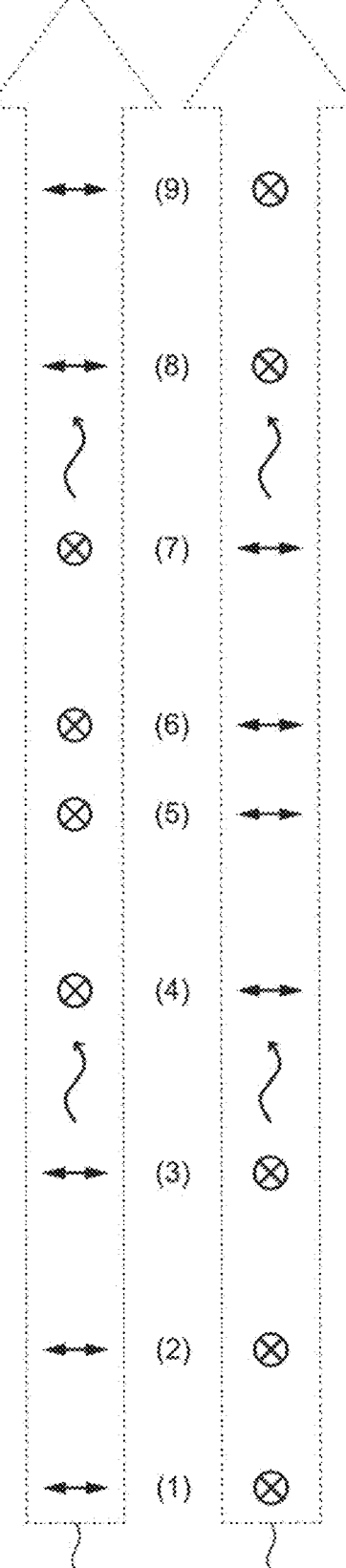
Figure 5B:
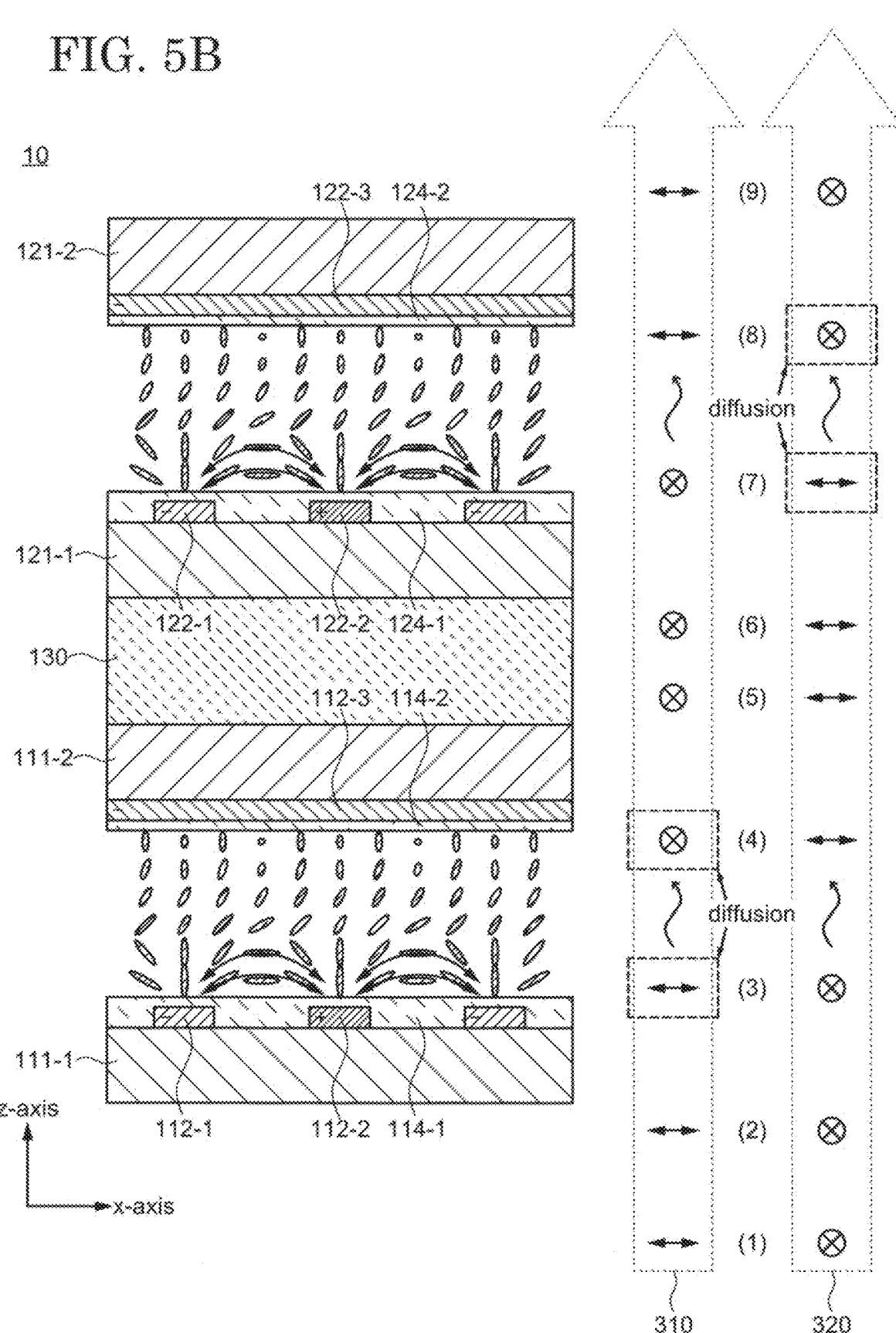
FIG. 5B is a schematic cross-sectional view illustrating control of a light distribution by an optical element according to an embodiment of the present invention.

FIGS. 5A and 5B are schematic cross-sectional views illustrating control of a light distribution by the optical element 10 according to an embodiment of the present invention. The optical element 10 shown in FIGS. 5A and 5B corresponds to a part of the cross-sectional view of the first liquid crystal cell 110 and the second liquid crystal cell 120 shown in FIG. 2A. In the optical element 10 shown in FIG. 5A, no potential is applied to any of the transparent electrodes. In the optical element 10 shown in FIG. 5B, a low potential is applied to the first transparent electrode 112-1 and the third transparent electrode 112-3 of the first liquid crystal cell 110, and a high potential is applied to the second transparent electrode 112-2 and the fourth transparent electrode 112-4. Similarly, a low potential is applied to the first transparent electrode 122-1 and the third transparent electrode 122-3 of the second liquid crystal cell 120, and a high potential is applied to the second transparent electrode 122-2 and the fourth transparent electrode 122-4. In FIG. 5B, for convenience, the low potential and the high potential are shown using the symbols "−" and "+", respectively.

In the optical element 10 shown in FIGS. 5A and 5B, the alignment treatment is performed on the first alignment film 114-1 of the first liquid crystal cell 110 and the first alignment film 124-1 of the second liquid crystal cell 120 along the x-axis direction. On the other hand, the alignment treatment is performed on the second alignment film 114-2 of the first liquid crystal cell 110 and the second alignment film 124-2 of the second liquid crystal cell 120 along the y-axis direction. Therefore, in the first liquid crystal cell 110, the alignment direction of the first alignment film 114-1 is the x-axis direction, and the alignment direction of the second alignment film 114-2 is the y-axis direction. Similarly, in the second liquid crystal cell 120, the alignment direction of the first alignment film 124-1 is the x-axis direction, and the alignment direction of the second alignment film 124-2 is the y-axis direction.

In FIGS. 5A and 5B, light enters from a direction perpendicular to the first substrate 111-1 of the first liquid crystal cell 110 and exits from the second substrate 121-2 of the second liquid crystal cell 120. Light incident on the first substrate 111-1 of the first liquid crystal cell 110 includes x-axis polarized light (P-polarized component) and y-axis polarized light (S-polarized component). Therefore, in the following, the process of transmission of these polarized components through the optical element 10 in FIG. 5B is described while the x-axis polarized light refers to a first polarized component and the y-axis polarized light refers to a second polarized component, for convenience.

The first polarization component 310 and the second polarization component 320 respectively correspond to the P-polarized component and S-polarized component of the light emitted from the light source (see (1) in FIG. 5B). In FIGS. 5A and 5B, the P-polarized component is shown using an arrow (an arrow indicating the horizontal direction of the paper surface), and the S-polarized component is shown using a circle with a cross (an arrow indicating the normal direction of the paper surface).

Since the liquid crystal molecules of the liquid crystal layer 113 on the side of the first substrate 111-1 of the first liquid crystal cell 110 have the long axes aligned along the x-axis direction as is shown in FIG. 5B, when a lateral electric field is generated between the first transparent electrode 112-1 and the second transparent electrode 112-2, these liquid crystal molecules have a refractive index distribution in the x-axis direction. Further, since the liquid crystal molecules of the liquid crystal layer 113 on the side of the second substrate 111-2 of the first liquid crystal cell 110 have the long axis aligned along the y-axis direction, when a lateral electric field is generated between the third transparent electrode 112-3 and the fourth transparent electrode 112-4, these liquid crystal molecules have a refractive index distribution in the y-axis direction.

Therefore, after the first polarization component 310 incident on the optical element 10 (more specifically, the first liquid crystal cell 110) enters the first substrate 111-1, the P-polarized component of the first polarization component 310 changes to the S-polarized component according to the twist of the alignment of the liquid crystal as it approaches the second substrate 111-2 (see (2) to (4) in FIG.

5B). More specifically, although the first polarization component 310 has a polarization axis in the x-axis direction on the side of the first substrate 111-1, the polarization axis gradually changes in the process of passing through the liquid crystal layer 113 in the thickness direction. Thus, the first polarization component 310 has a polarization axis in the y-axis direction on the side of the second substrate 111-2 and then is emitted from the second substrate 112-2 (see (5) in FIG. 5B). Here, as shown in FIG. 5B, when a lateral electric field is generated between the first transparent electrode 112-1 and the second transparent electrode 112-2, the alignment states of the liquid crystal molecules change due to the influence of the lateral electric field shown in FIG. 4A and the refractive index distribution changes. Further, since the polarization axis of the first polarization component 310 is parallel to the alignment direction of the liquid crystal molecules of the liquid crystal layer 113 on the side of the first substrate 111-1, the first polarization component 310 is diffused in the x-axis direction according to the refractive index distribution of the crystal molecules on the side of the first substrate 111-1. Furthermore, the polarization axis of the first polarization component 310 changes from the x-axis to the y-axis in the liquid crystal layer 113, so that the polarization of the first polarization component 310 is parallel to the alignment direction of the liquid crystal molecules on the side of the second substrate 111-2. Here, as shown in FIG. 5B, when a lateral electric field is generated between the third transparent electrode 112-3 and the fourth transparent electrode 112-4, the alignment states of the liquid crystal molecules change due to the influence of the lateral electric field shown in FIG. 4B and the refractive index distribution changes. Therefore, the first polarization component 310 is diffused in the y-axis direction according to the refractive index distribution of the liquid crystal molecules on the side of the second substrate 111-2.

Further, as shown in FIG. 5B, after the second polarization component 320 that has the S-polarized component before entering the optical element 10 (more specifically, the first liquid crystal cell 110) enters the first substrate 111-1, the S-polarized component of the second polarization component 320 changes to the P-polarized component according to the twist of the alignment of the liquid crystal as it approaches the second substrate 111-2 (see (2) to (4) in FIG. 5B). More specifically, although the second polarization component 320 has a polarization axis in the y-axis direction on the side of the first substrate 111-1, the polarization axis gradually changes in the process of passing through the liquid crystal layer 113 in the thickness direction. Thus, the second polarization component 320 has a polarization axis in the x-axis direction on the side of the second substrate 112-2 and then is emitted from the second substrate 112-2 (see (5) in FIG. 5B). Here, even when a lateral electric field is generated between the first transparent electrode 112-1 and the second transparent electrode 112-2, the second polarization component 320 is not affected by the refractive index distribution of the liquid crystal molecules on the side of the first substrate 111-1 and passes through the liquid crystal layer 113 on the side of the first substrate 111-1 without being diffused because the polarization axis is orthogonal to the alignment direction of the liquid crystal molecules. Further, the polarization axis of the second polarization component 320 changes from the y-axis direction to the x-axis direction in the liquid crystal layer 113. Therefore, the second polarization component 320 is not affected by the refractive index distribution of the liquid crystal molecules on the side of the second substrate 111-2 and passes through the liquid crystal 113 on the side of the second substrate 111-2 without being diffused because the polarization axis is orthogonal to the alignment direction of the liquid crystal molecules.

That is, although the polarization axis of the second polarization component 320 that has the S-polarized component before entering the optical element 10 changes from the y-axis to the x-axis, which corresponds to the P-polarized component, in the process of passing through the first liquid crystal cell 110, the diffusion similar to the first polarization component 310 does not occur.

The liquid crystal molecules of the liquid crystal layer 123 of the second liquid crystal cell 120 also have the same refractive index distribution as the liquid crystal molecules of the liquid crystal layer 113 of the first liquid crystal cell 110. Therefore, the same phenomenon as in the first liquid crystal cell 110 basically occurs also in the second liquid crystal cell 120. On the other hand, since the directions of the polarization axes of the first polarization component 310 and the second polarization component 320 are switched when passing through the first liquid cell 110, the polarization component affected by the refractive index distribution of the liquid crystal molecules in the liquid crystal layer 113 are also switched. That is, as shown in FIG. 5B, even when a lateral electric field is generated between the first transparent electrode 122-1 and the second transparent electrode 122-2 of the second liquid crystal cell 120 and between the third transparent electrode 122-3 and the fourth transparent electrode 122-3, the polarization axis of the first polarization component 310 changes from the y-axis direction to the x-axis direction again (see (6) to (8) in FIG. 5B) but the first polarization component 310 is not diffused. On the other hand, the polarization axis of the second polarization component 320 changes from the x-axis direction to the y-axis direction again (see (6) to (8) in FIG. 5B) and the second polarization component 320 is diffused by the influence of the refractive index distribution of the liquid crystal molecules of the liquid crystal layer 123.

As can be seen from the above, in the optical element 10, by stacking the two liquid crystal cells (the first liquid crystal cell 110 and the second liquid crystal cell 120), the polarization direction of the light incident on the optical element 10 changes twice. Thus, the same polarization direction of light before entering the optical element 10 and after being emitted from the optical element 10 can be maintained (see (1) and (9) in FIG. 5B). On the other hand, in the optical element 10, the refractive index distribution of the liquid crystal molecules of the liquid crystal layer in the liquid crystal cell can change and the transmitted light can be refracted. More specifically, the first liquid crystal cell 110 diffuses the light of the first polarization component 310 (P-polarized component) in the x-axis direction, the y-axis direction, or both the x-axis and y-axis directions, and the liquid crystal cell 120 diffuses the light of the second polarization component 320 (the S-polarized component) in the x-axis direction, the y-axis direction, or both the x-axis and y-axis directions. Therefore, when unpolarized light is diffused without changing the polarization state of the light, it is preferable that the number of the stacked liquid crystal cells is even.

Further, in the above description, the process of diffusing the light and changing the polarization axis when each polarization component passes through the optical element 10 is described with reference to mainly FIG. 5B. The optical element 10 in FIG. 5A is in a state where no potential is applied to each transparent electrode (a state in which there is no potential difference between adjacent transparent electrodes), and the optical element 10 changes the polarization axis of the polarization component the same as the optical element in FIG. 5B except that the polarization component is not diffused. To avoid a duplication of the description, the description of the polarization components passing through the optical element 10 in FIG. 5A is given the same reference numerals as (1) to (9) in FIG. 5B, and the description thereof is omitted.

In addition, as shown in FIGS. 5A and 5B, the optical elastic resin layer 130 is provided between the first liquid crystal cell 110 and the second liquid crystal cell 120. The light can be refracted in the interface between the second substrate 111-2 of the first liquid crystal cell 110 and the optical elastic resin layer 130 or the interface between the first substrate 121-1 of the second liquid crystal cell 120 and the optical elastic resin layer 130. Therefore, the refractive index of the optical elastic resin of the optical elastic resin layer 130 is close to the refractive index of the second substrate 111-2 of the first liquid crystal cell 110 and the refractive index of the first substrate 121-1 of the second liquid crystal cell 120. Further, the optical element 10 is placed at a position close to the light source, so that the temperature of the optical element 10 may rise due to the heat from the light source. In this case, the thickness of the optical elastic resin layer 130 is preferably larger than the inter-substrate distance d corresponding to a distance between the first substrate 111-1 and the second substrate 111-2 in the first liquid crystal cell 110 or the first substrate 121-1 and the second substrate 121-2 in the second liquid crystal cell 120 so that the influence of the thermal expansion of the optical resin in the optical elastic resin layer can be reduced.

The optical element 10 can control the light distribution of transmitted light by potentials applied to respective transparent electrodes. That is, the optical element 10 can form a predetermined light distribution pattern. Here, a formation of a distribution pattern spreading in the x-axis direction which is obtained by using the optical element 10 having the two liquid crystal cells (the first liquid crystal cell 110 and the second liquid crystal cell 120) is described as an example, with reference to FIG. 6.

Figure 6:
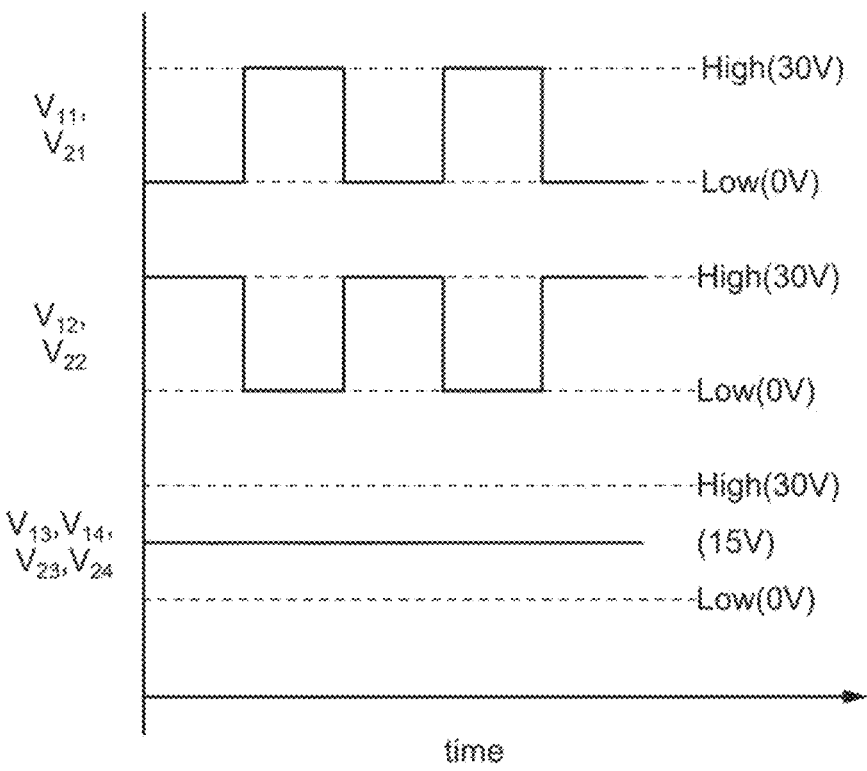
FIG. 6 is a timing chart showing potentials applied to each transparent electrode included in an optical element according to an embodiment of the present invention.

FIG. 6 is a timing chart showing potentials applied to each transparent electrode included in the optical element 10 according to an embodiment of the present invention. Table 1 shows signs (V11, etc.) of the potentials shown in FIG. 6.

TABLE 1

| | | |
|---|---|---|
| First liquid crystal cell 110 | First electrode 112-1 | $V_{11}$ |
| | Second electrode 112-2 | $V_{12}$ |
| | Third electrode 112-3 | $V_{13}$ |
| | Fourth electrode 112-4 | $V_{14}$ |
| Second liquid crystal cell 120 | First electrode 122-1 | $V_{21}$ |
| | Second electrode 122-2 | $V_{22}$ |
| | Third electrode 122-3 | $V_{23}$ |
| | Fourth electrode 122-4 | $V_{24}$ |

In the following description, for convenience, the potential applied to each transparent electrode is defined as a first potential (a variable potential, for example, 0 V for a low potential and 30 V for a high potential), a second potential having a phase opposite to the first potential (a variable potential, for example, 0 V for low potential and 30 V for high potential), or a third potential (an intermediate potential, for example, 15 V). The third potential is a potential between the low potential and the high potential, and may be a fixed potential or a variable potential. In addition, the values of the potentials are not limited to 0 V, 15 V, and 30 V shown in FIG. 6.

In the first liquid crystal cell 110, the first potential and the second potential are applied to the first transparent electrode 112-1 and the second transparent electrode 112-2, respectively. Further, the third potential is applied to each of the third transparent electrode 112-3 and the fourth transparent electrode 112-4. The phases of the first potential applied to the first transparent electrode 112-1 and the second potential applied to the second transparent electrode 112-2 are inverted. Therefore, a potential difference (for example, +30 V or −30 V) is generated between the first transparent electrode 112-1 and the second transparent electrode 112-2. On the other hand, there is no potential difference between the third transparent electrode 112-3 and the fourth transparent electrode 112-4 on the side of the second substrate 111-2. Further, a potential difference of +15 V or −15 V is generated between the third transparent electrode 112-3 or the fourth transparent electrode 112-4 on the side of the second substrate 111-2 and the first transparent electrode 112-1 on the side of the first substrate 111-1 or between the third transparent electrode 112-3 or the fourth transparent electrode 112-4 on the side of the second substrate 111-2 and the second transparent electrode 112-2 on the side of the first substrate 111-1 even when any potential is applied to the third transparent electrode 112-3 and the fourth transparent electrode 112-4 on the side of the second substrate 112-2. There is no bias in the potential difference between one transparent electrode and the other transparent electrode on the side of the first substrate 111-1 in terms of absolute values.

As a result, the alignment states of the liquid crystal molecules on the side of the first substrate 111-1 change according to the potential difference between the first transparent electrode 112-1 and the second transparent electrode 112-2 (see FIGS. 4A and 4B etc.). On the other hand, no potential difference between the third transparent electrode 112-3, and the fourth transparent electrode 112-4 and the second substrate 111-2 is far enough from the first substrate 111-1 that the liquid crystal molecules on the side of the second substrate 111-2 are not affected by the potential on the side of the first substrate 111-1. Thus, the alignment direction of the liquid crystal molecules on the side of the second substrate 111-2 does not change from the initial alignment direction. Further, since the third potential applied to the third transparent electrode 112-3 and the fourth transparent electrode 112-4 is an intermediate potential between the first potential and the second potential, no capacitance is accumulated even when the low potential and the high potential are alternatively applied to the first transparent electrode 112-1 and the second transparent electrode 112-2, and the alignment states of the liquid crystal molecules on the side of the second substrate 111-2 do not change.

In the second liquid crystal cell 120, the first potential and the second potential are applied to the first transparent electrode 122-1 and the second transparent electrode 122-2, respectively. Further, the third potential is applied to each of the third transparent electrode 122-3 and the fourth transparent electrode 122-4. The phases of the first potential applied to the first transparent electrode 122-1 and the second potential applied to the second transparent electrode 122-2 are inverted. Therefore, a potential difference (for example, +30 V or −30 V) is generated between the first transparent electrode 122-1 and the second transparent electrode 122-2. On the other hand, there is no potential difference between the third transparent electrode 122-3 and the fourth transparent electrode 122-4 on the side of the second substrate 121-2. Further, a potential difference of +15 V or −15 V is generated between the third transparent electrode 122-3 or the fourth transparent electrode 122-4 on the side of the second substrate 121-2 and the first transparent electrode 122-1 on the side of the first substrate 121-1 or between the third transparent electrode 122-3 or the fourth transparent electrode 122-4 on the side of the second substrate 121-2 and the second transparent electrode 122-3 on the side of the first substrate 121-1 even when any potential is applied to the third transparent electrode 122-3 and the fourth transparent electrode 122-4 on the side of the second substrate 121-2. There is no bias in the potential difference between one transparent electrode and the other transparent electrode on the side of the first substrate 121-1 in terms of absolute values.

As a result, the alignment states of the liquid crystal molecules on the side of the first substrate 121-1 change according to the potential difference between the first transparent electrode 122-1 and the second transparent electrode 122-2 (see FIGS. 4A and 4B etc.). On the other hand, no potential difference between the third transparent electrode 122-3, and the fourth transparent electrode 122-4 and the second substrate 121-2 is far enough from the first substrate 121-1 that the liquid crystal molecules on the side of the second substrate 121-2 are not affected by the potential on the side of the first substrate 121-1. Thus, the alignment direction of the liquid crystal molecules on the side of the second substrate 121-2 does not change from the initial alignment direction. Further, since the third potential applied to the third transparent electrode 122-3 and the fourth transparent electrode 122-4 is an intermediate potential between the first potential and the second potential, no capacitance is accumulated even when the low potential and the high potential are alternatively applied to the first transparent electrode 122-1 and the second transparent electrode 122-2, and the alignment states of the liquid crystal molecules on the side of the second substrate 121-2 do not change.

Further, as shown in FIG. 6, the time changes in the potential of the first transparent electrode 112-1 and the second transparent electrode 112-2 of the first liquid crystal cell 110 are synchronized with the time changes in the potential of the first transparent electrode 122-1 and the second transparent electrode 122-2 of the second liquid crystal cell 120, respectively.

When the potentials as described above are applied to respective transparent electrodes, the liquid crystal molecules of the liquid crystal layer 113 on the side of the first substrate 111-1 of the first liquid crystal cell 110 can refract the light having the polarization in the x-axis direction in the x-axis direction. Therefore, the first liquid crystal cell 110 can diffuse the light having the polarization in the x-axis direction in the x-axis direction.

Further, the liquid crystal molecules of the liquid crystal layer 123 on the side of the first substrate 121-1 of the second liquid crystal cell 120 can also refract the light having the polarization in the x-axis direction in the x-axis direction. Therefore, the second liquid crystal cell 120 also diffuses the light having the polarization in the x-axis direction in the x-axis direction.

That is, in the case that potentials of respective transparent electrodes correspond to the potentials shown in FIG. 6, when light is incident from the side of the first substrate 111-1 of the first liquid crystal cell 110 (This means that light is irradiated from the lower side of the first liquid crystal cell 110 toward the first substrate 111-1 as shown in FIGS. 5A and 5B), the optical element 10 diffuses the first polarization component 310 having the polarization axis in the x-axis direction in the x-axis direction on the side of the first substrate 111-1 while the polarization axis changes from the x-axis direction to the y-axis direction in the process of passing through the first liquid crystal cell 110. On the other hand, the second polarization component 320 having the polarization in the y-axis is not diffused and the polarization axis changes from the y-axis direction to the x-axis direction. Then, these polarization components enter the second liquid crystal cell 120. The optical element 10 diffuses the second polarization component 320, of which the polarization axis changes from the y-axis direction to the x-axis direction without diffusing in the first liquid crystal cell 110, in the x-axis direction on the side of the first substrate 121-1 while the polarization axis changes from the x-axis direction to the y-axis direction in the process of passing through the second liquid crystal cell 120. On the other hand, the first polarization component 310 is not diffused and the polarization axis changes from the y-axis direction to the x-axis direction. As a result, the light incident on the optical element 10 is diffused in the x-direction in the process of passing through the first liquid crystal cell 110 or the second liquid crystal cell 120. Therefore, the light transmitted through the optical element 10 can form a light distribution pattern spreading in the x-axis direction.

The light distribution angle indicating the distribution of light can be controlled by the magnitude of the potential applied to the transparent electrode. For example, when the potential applied to the transparent electrode is increased, the light distribution angle increases and a light distribution pattern in which light is more diffused is obtained. The light distribution angle can also be controlled by, for example, the inter-substrate distance d or a pitch p corresponding to a distance between the two adjacent transparent electrodes.

[4. Correlation Between Inter-Substrate Distance and Pitch]

The correlation between the substrate-substrate distance d and the pitch p is described in detail with reference to FIG. 7.

Figure 7:
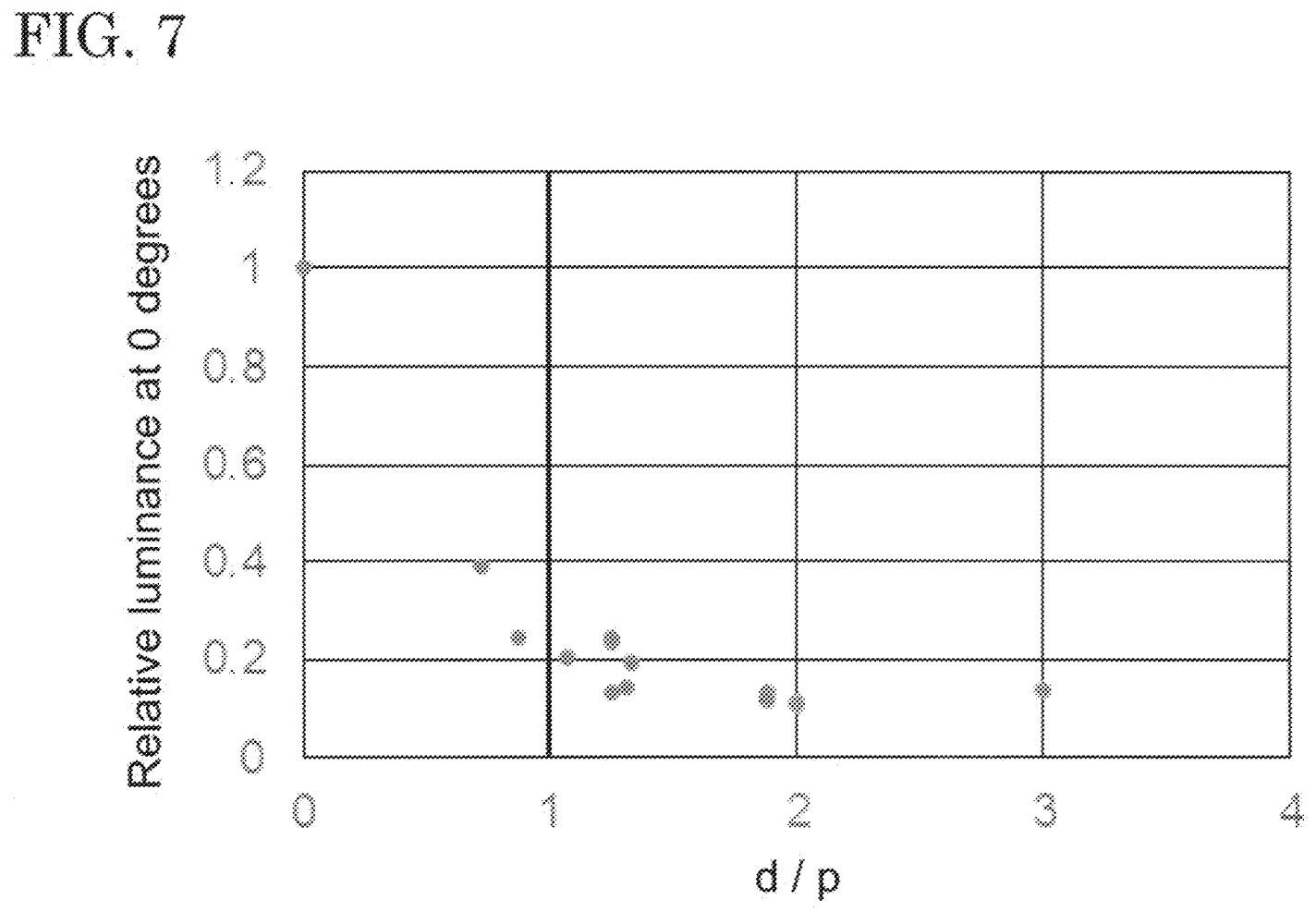

FIG. 7 is a graph showing front relative luminance (relative luminance at 0 degrees) versus d/p in the liquid crystal cell of the optical element 10 according to an embodiment of the present invention. The inter-substrate distance d is the distance between the first substrate 111-1 and the second substrate 111-2 of the first liquid crystal cell 110 (or the distance between the first substrate 121-1 and the second substrate 121-2 of the second liquid crystal cell 120), as shown in FIGS. 3A to 4B. Further, the pitch p is the distance between the centers of the two adjacent transparent electrodes on the first substrate 111-1 (or the first substrate 121-1) or the second substrate 111-2 (or the second substrate 121-2). Furthermore, the front relative luminance is the luminance of light emitted from the vertical direction (0 degrees) of the second substrate 111-2 of light which is incident on the first substrate 111-1 (or the first substrate 121-1) and emitted from the second substrate 111-2 (or the second substrate 121-2). In the graph shown in FIG. 11, the front relative luminance is normalized with the luminance of the light without the optical element 10 (in the case of only the light source) as 1. Therefore, the y-axis of the graph shown in FIG. 7 can also be referred as the relative luminance ratio when the luminance without the optical element 10 is set to 1.

In addition, the liquid crystal cell from which data of the graph shown in FIG. 7 is obtained has the first transparent electrode 112-1 and the second transparent electrode 112-2 formed on the first substrate 111-1 but the third transparent electrode 112-3 and the fourth transparent electrode 112-4 are not formed on the second substrate 111-2. Further, when the luminance is measured, a low potential (0 V) was applied to the first transparent electrode 112-1 and a high potential (30 V) was applied to the second transparent electrode 112-2.

As shown in FIG. 7, although the front relative luminance decreases as d/p increases, the rate of the decrease in the front relative luminance differs greatly between d/p<1 and d/p≥1. In d/p<1, although the front relative luminance decreases significantly as d/p=1 is approached, the front relative luminance is measured at about 0.2 to 0.4. This indicates that although the luminance is decreased due to the diffusion of light by the liquid crystal cell, the diffusion is still insufficient. On the other hand, in d/p≥1, the front relative luminance is less than or equal to 0.1, and then the front relative luminance is stable even when d/p is increased. This indicates that the diffusion of light by the liquid crystal cell is sufficient in d/p≥1. That is, excellent light diffusion is provided in d/p≥1. Therefore, in the optical element 10, the inter-substrate distance d and the pitch p preferably satisfy d/p≥1, more preferably d/p≥2.

Further, since the transparent electrode material has a high refractive index, the transparent electrode may affect the transmittance of the liquid crystal cell. Therefore, it is preferable that the width of the transparent electrode is small. That is, it is preferable that an inter-electrode distance b between the two adjacent electrodes is less than or equal to the width a of the transparent electrode. For example, when the inter-electrode distance b is expressed in relation to the pitch p, it is preferable to satisfy p/2≤b.

As described above, the optical element 10 according to the present embodiment can control the light distribution of the light transmitted through the optical element 10 by controlling the potentials applied to respective transparent electrodes. However, when each transparent electrode merely extends linearly, moire due to light interference or coloration due to the wavelength dependence of the refractive index occurs. Therefore, the optical element 10 according to the present embodiment has a shape and an arrangement of the transparent electrode that can reduce moire or coloration.

[5. Shape and Arrangement of Transparent Electrode]

Figure 8:
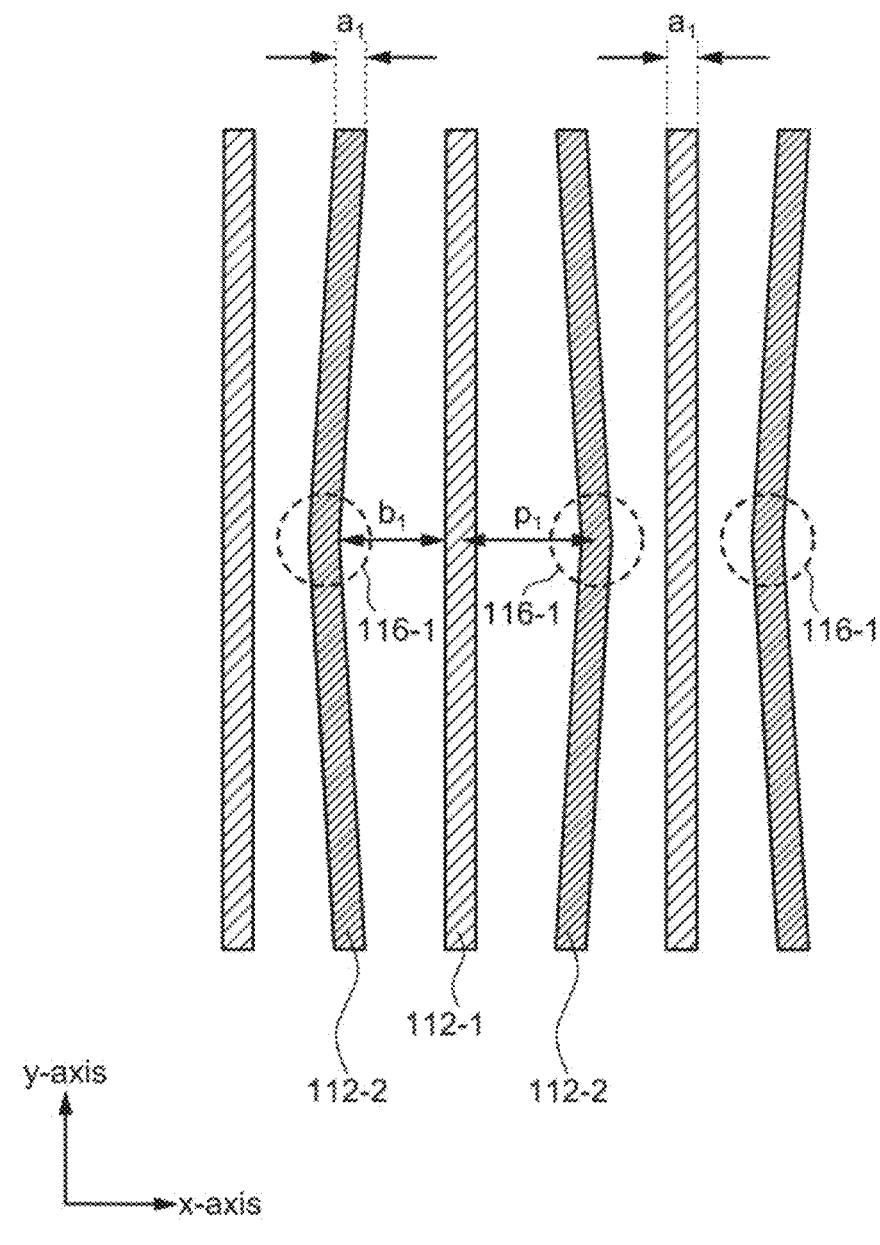
FIG. 8 is a schematic diagram illustrating a shape and arrangement of a first transparent electrode and a second transparent electrode of a first liquid crystal cell of an optical element according to an embodiment of the present invention.

FIG. 8 is a schematic diagram illustrating a shape and arrangement of the first transparent electrode 112-1 and the second transparent electrode 112-2 of the first liquid crystal cell 110 of the optical element 10 according to an embodiment of the present invention.

As shown in FIG. 8, the first transparent electrode 112-1 and the second transparent electrode 112-2 on the first substrate 111-1 of the first liquid crystal cell 110 are alternately and repeatedly arranged in the x-axis direction, and each of the first transparent electrode 112-1 and the second transparent electrode 112-2 is provided to extend in the y-axis direction. The first transparent electrode 112-1 is provided in a linear shape in the y-axis direction. On the other hand, the second transparent electrode 112-2 is provided in a dogleg shape having a first bent portion 116-1 bent in the x-axis direction. That is, the second transparent electrode 112-2 includes a straight portion having a predetermined angle with respect to the extending direction (y-axis direction) of the first transparent electrode 112-1 and the first bent portion 116-1 connecting the straight portion. In addition, the predetermined angle is greater than or equal to 0 degrees and less than or equal to 4 degrees, and is very small. Therefore, although the side edge of the first transparent electrode 112-1 is perpendicular to the alignment direction (y-axis direction) of the first alignment film 114-1, the side edge of the second transparent electrode 112-2 is inclined by the predetermined angle with respect to the alignment direction of the first alignment film 114-1. Further, when the width (the distance between the long sides) of the linear portion of the second transparent electrode 112-2 provided at an angle with respect to the y-axis direction is $a_1$, the length of the second transparent electrode 112-2 in the x-axis direction is slightly larger than a1, but the length of the straight portion in the x-axis direction can be regarded as $a_1$. Therefore, in the following description, the length of the second transparent electrode 112-2 in the x-axis direction is assumed to be $a_1$, for convenience.

Moreover, hereinafter, the extending direction of the electrode refers to a direction parallel to the extending direction of the linearly extending electrode. More specifically, the extending direction corresponds to the y-axis direction on the side of the first substrate 111-1 and corresponds to the x-axis direction on the side of the second substrate 111-2.

The two second transparent electrodes 112-2 adjacent to the first transparent electrode 112-1 are provided line-symmetrically with respect to the extending direction of the first transparent electrode 112-1. Therefore, as shown in FIG. 8, when viewed from the first transparent electrode 112-1 in the middle, the second transparent electrode 112-2 on the left side and the second transparent electrode 112-2 in the middle are farthest from each other at the first bent portion 116-1. Further, when viewed from the first transparent electrode 112-1 on the right side, the second transparent electrode 112-2 in the middle and the second transparent electrode 112-2 on the right side are closest to each other at the first bent portion 116-1. In the shape and arrangement of the transparent electrodes shown in FIG. 8, the pitch between the first transparent electrode 112-1 and the second transparent electrode 112-2 and the inter-electrode distance between the first transparent electrode 112-1 and the second transparent electrode 112-2 gradually change in the y-axis direction. Further, since the second transparent electrode 112-2 is inclined with respect to the y-axis direction, the electric field formed between the first transparent electrode 112-1 and the second transparent electrode 112-1 adjacent to each other also slightly changes in the y-axis direction. Therefore, moire due to light interference and coloration due to wavelength dependence can be reduced.

The first transparent electrode 112-1 and the second transparent electrode 112-2 have a first maximum pitch $p_1$ and a first maximum inter-electrode distance b1 at the first bent portion 116-1. That is, $p_1=a_1+b_1$ is satisfied. As described above, the distribution of light, ie, the light distribution angle, can also be controlled by the inter-substrate distance d and the pitch p. In the shape and arrangement of the transparent electrodes shown in FIG. 8, it is preferable to satisfy $d/p_1 \geq 1$, and it is more preferable to satisfy $d/p_1 \geq 2$. Further, the relationship between the first maximum pitch $p_1$ and the first maximum inter-electrode distance $b_1$ preferably satisfies $p_1/2 \leq b_1$. By satisfying these conditions, the first liquid crystal cell 110 can control the potentials applied to the first transparent electrode 112-1 and the second transparent electrode 112-2 to sufficiently diffuse the transmitted light.

In FIG. 8, the first bent portion 116-1 is provided only at one location along the length direction (y-axis direction) of the second transparent electrode 112-2. A configuration in which a plurality of bent portions 116-1 are provided along the length direction can also be adopted.

Figure 9:
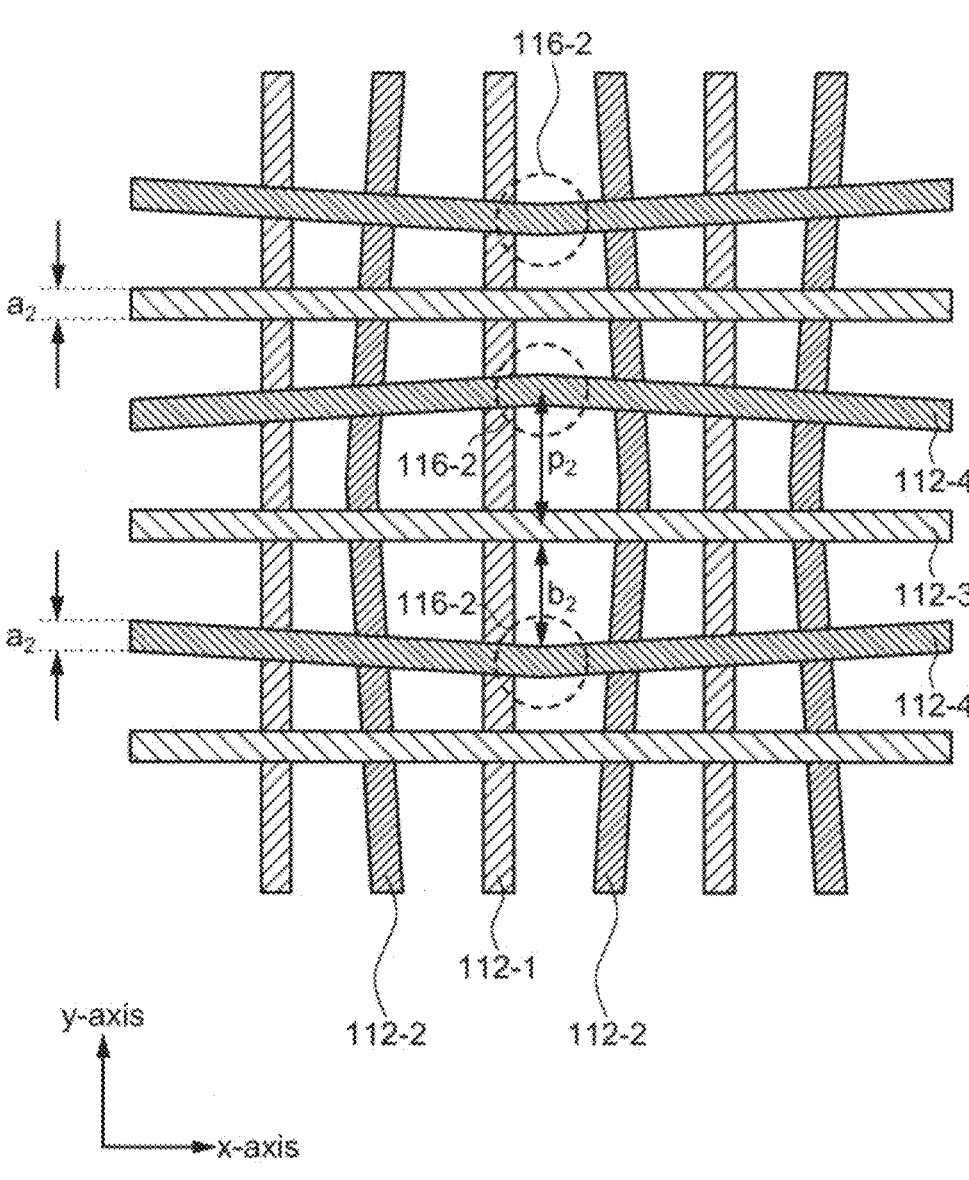
FIG. 9 is a schematic diagram illustrating a shape and arrangement of a first transparent electrode, a second transparent electrode, a third transparent electrode, and a fourth transparent electrode of a first liquid crystal cell of an optical element according to an embodiment of the present invention.

FIG. 9 is a schematic diagram illustrating a shape and arrangement of the first transparent electrode 112-1, the second transparent electrode 112-2, the third transparent electrode 112-3, and the fourth transparent electrode 112-4 of the first liquid crystal cell 110 of the optical element 10 according to an embodiment of the present invention.

The third transparent electrode 112-3 and the fourth transparent electrode 112-4 on the second substrate 111-2 of the first liquid crystal cell 110 have the same shape and arrangement as the first transparent electrode 112-1 and the second transparent electrode 112-2 rotated by 90 degrees. That is, the third transparent electrode 112-3 and the fourth transparent electrode 112-4 are alternately and repeatedly arranged in the y-axis direction, and each of the third transparent electrode 112-3 and the fourth transparent electrode 112-4 is provided to extend in the x-axis direction. The third transparent electrode 112-3 is arranged linearly in the x-axis direction. On the other hand, the fourth transparent electrode 112-4 is provided in a dogleg shape having a second bent portion 116-2 bent in the y-axis direction. Further, the two fourth transparent electrodes 112-4 adjacent to the third transparent electrode 112-3 are provided line-symmetrically with respect to the extending direction of the third transparent electrode 112-3. Therefore, in the optical element 10 according to the present embodiment as well, since the pitch and the inter-electrode distance between the transparent electrodes are changed, moire and coloration can be reduced.

The third transparent electrode 112-3 and the fourth transparent electrode 112-4 have a second maximum pitch $p_2$ and a second maximum inter-electrode distance $b_2$ at the second bent portion 116-2. The width of each of the third transparent electrode 112-3 and the fourth transparent electrode 112-4 is $a_1$, and $p_2=a_2+b_2$ is satisfied. In the shape and arrangement as shown in FIG. 9, it is preferable to satisfy $d/p_2 \geq 1$, and it is more preferable to satisfy $d/p_2 \geq 2$. Further, the relationship between the second maximum pitch $p_2$ and the second maximum inter-electrode distance $b_2$ preferably satisfies $p_2/2 \leq b_2$. By satisfying these conditions, the first liquid crystal cell 110 can control the potentials applied to the third transparent electrode 112-3 and the fourth transparent electrode 112-4 to sufficiently diffuse the transmitted light.

As described above, the optical element 10 according to the present embodiment can control the potential applied to each transparent electrode to control the light distribution of transmitted light. Further, in the optical element 10 according to the present embodiment, since the pitch and the inter-electrode distance between the transparent electrodes are changed, moiré and coloration can be reduced.

Second Embodiment

A shape and arrangement of a first transparent electrode 112A-1 and a second transparent electrode 112A-1 different from the first transparent electrode 112-1 and the second transparent electrode 112-2 described in the First Embodiment is described.

Figure 10:
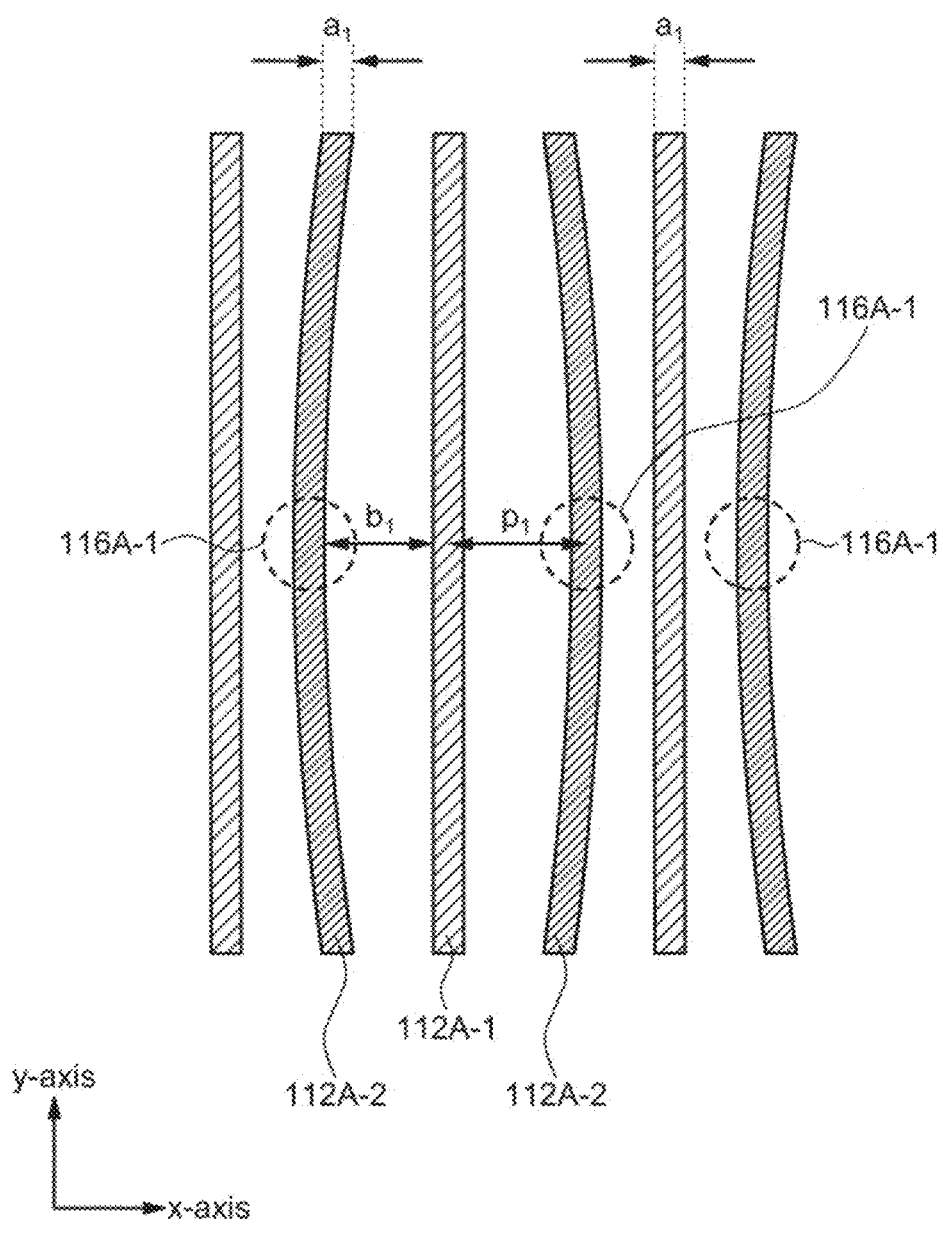
FIG. 10 is a schematic diagram illustrating a shape and arrangement of a first transparent electrode and a second transparent electrode of a first liquid crystal cell of an optical element according to an embodiment of the present invention.

FIG. 10 is a schematic diagram illustrating a shape and arrangement of the first transparent electrode 112A-1 and the second transparent electrode 112A-2 of the first liquid crystal cell 110 of the optical element 10 according to an embodiment of the present invention. In the following description, when the configurations of the first transparent electrode 112A-1 and the second transparent electrode 112A-2 are the same as the configurations of the first transparent electrode 112-1 and the second transparent electrode 112-2 described in the First Embodiment, the description of the configurations of the first transparent electrode 112A-1 and the second transparent electrode 112A-2 may be omitted.

As shown in FIG. 10, the first transparent electrode 112A-1 and the second transparent electrode 112A-2 on the first substrate 111-1 of the first liquid crystal cell 110 are alternately and repeatedly arranged in the x-axis direction, and each of the first transparent electrode 112A-1 and the second transparent electrode 112A-2 is provided to extend in the y-axis direction. The first transparent electrode 112A-1 is provided in a linear shape in the y-axis direction. On the other hand, the second transparent electrode 112A-2 is provided in a curved shape that bends in the x-axis direction. That is, the second transparent electrode 112A-2 includes a curved portion extending in the extending direction (y-axis direction) of the first transparent electrode 112A-1 while bending in the x-axis direction, and a first top portion in which the direction of the curved portion is changed. In addition, the two second transparent electrodes 112A-2 adjacent to the first transparent electrode 112A-1 is provided line-symmetrically with respect to the extending direction of the first transparent electrode 112A-1. Therefore, although the side edge of the first transparent electrode 112A-1 is perpendicular to the alignment direction of the first alignment film 114-1, the side edge of the second transparent electrode 112A-2 is curved with respect to the alignment direction of the first alignment film 114-1.

The first transparent electrode 112A-1 and the second transparent electrode 112A-2 have a first maximum pitch $p_1$ and a first maximum inter-electrode distance $b_1$ at the first top portion 116-1. The width of each of the first transparent electrode 112A-1 and the second transparent electrode 112A-2 is $a_1$, and $p_1=a_1+b_1$ is satisfied. In the shape and arrangement of the transparent electrodes shown in FIG. 10, it is preferable to satisfy $d/p_1 \geq 1$, and it is more preferable to satisfy $d/p_1 \geq 2$. Further, the relationship between the first maximum pitch $p_1$ and the first maximum inter-electrode distance $b_1$ preferably satisfies $p_{1/2} \leq b_1$. By satisfying these conditions, the first liquid crystal cell 110 can control the potentials applied to the first transparent electrode 112A-1 and the second transparent electrode 112A-2 to sufficiently diffuse the transmitted light.

As described above, the optical element 10 according to the present embodiment can control the potential applied to each transparent electrode to control the light distribution of transmitted light. Further, in the optical element 10 according to the present embodiment, since the pitch and the inter-electrode distance is gradually changed in the y-axis direction and the second transparent electrode 112-2 is curved with respect to the y-axis direction, the electric field formed between the first transparent electrode 112-1 and the second transparent electrode 112-1 adjacent to each other also slightly changes in the y-axis direction. Therefore, moiré and coloration can be reduced.

Third Embodiment

A shape and arrangement of a first transparent electrode 112B-1 and a second transparent electrode 112B-2 different from the shape and arrangement of the transparent electrodes described in the First Embodiment and Second Embodiment are described with reference to FIG. 11.

Figure 11:
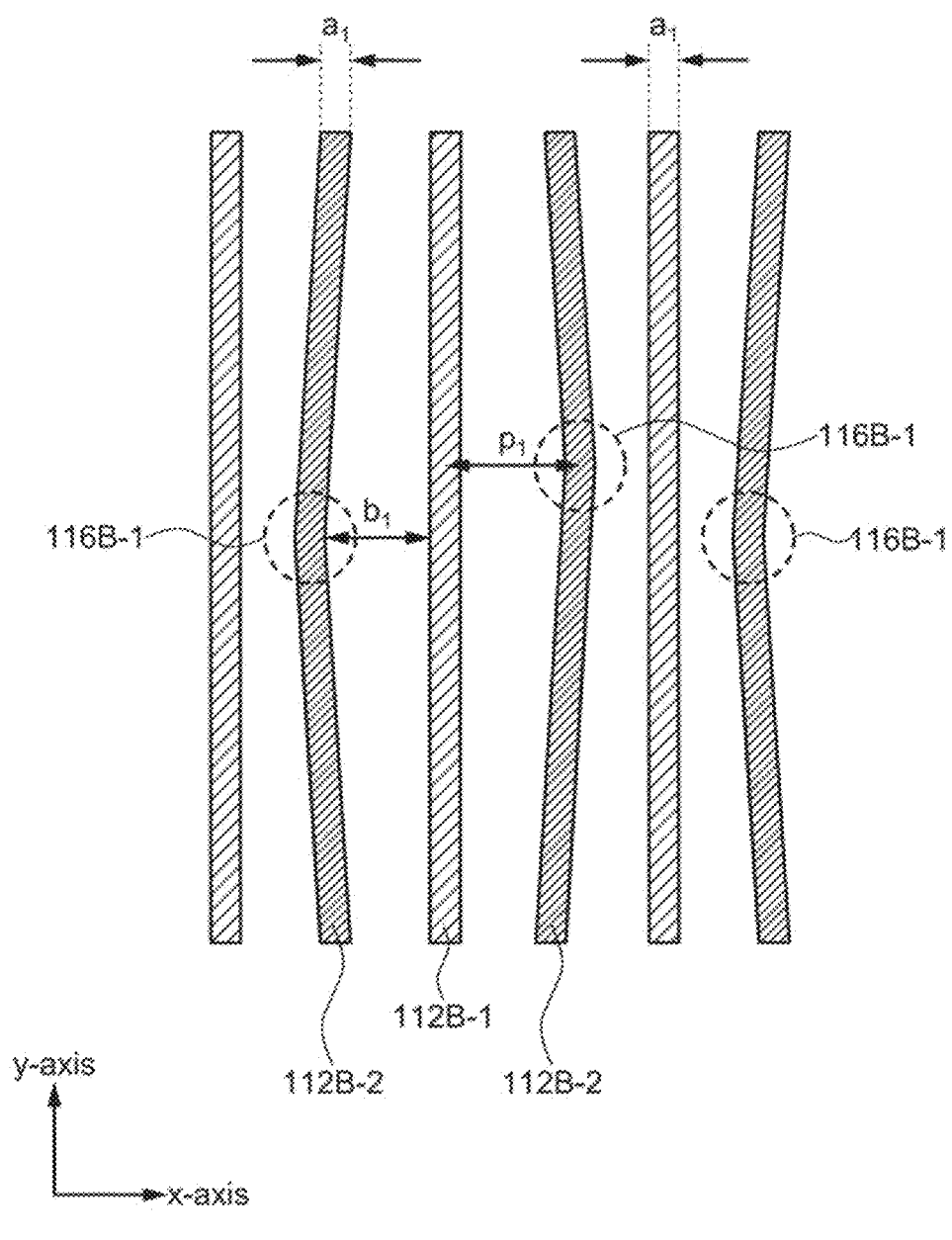
FIG. 11 is a schematic diagram illustrating a shape and arrangement of a first transparent electrode and a second transparent electrode of a first liquid crystal cell of an optical element according to an embodiment of the present invention.

FIG. 11 is a schematic diagram illustrating a shape and arrangement of the first transparent electrode 112B-1 and the second transparent electrode 112B-2 of the first liquid crystal cell 110 of the optical element 10 according to an embodiment of the present invention. In the following description, when the configurations of the first transparent electrode 112B-1 and the second transparent electrode 112B-2 are the same as the configurations of the first transparent electrode 112-1 and the second transparent electrode 112-2 described in the First Embodiment, the description of the configurations of the first transparent electrode 112B-1 and the second transparent electrode 112B-2 may be omitted.

As shown in FIG. 11, the first transparent electrode 112B-1 and the second transparent electrode 112B-2 are alternately and repeatedly arranged in the x-axis direction, and each of the first transparent electrode 112B-1 and the second transparent electrode 112B-2 is provided to extend in the y-axis direction. The first transparent electrode 112B-1 is provided in a linear shape in the y-axis direction. On the other hand, the second transparent electrode 112B-2 is provided in a dogleg shape having a first bent portion 116B-1 bent in the x-axis direction. Therefore, in the optical element 10 according to the present embodiment as well, since the pitch and the inter-electrode distance between the transparent electrodes are changed, moire and coloration can be reduced.

Further, in the shape and arrangement of the transparent electrodes shown in FIG. 11, the two second transparent electrodes 112B-2 adjacent to the first transparent electrode 112B-1 is provided asymmetrically with respect to the extending direction of the first transparent electrode 112B-1. Specifically, the first bent portions 116B-1 of the two second transparent electrodes 112B-2 adjacent to the first transparent electrode 112B-1 are provided at different positions. Therefore, since the symmetry of the arrangement of the transparent electrodes is reduced, moire or coloration can be reduced.

The first transparent electrode 112B-1 and the second transparent electrode 112B-2 have a first maximum pitch $p_1$ and a first maximum inter-electrode distance $b_1$ at the first bent portion 116B-1. The width of each of the first transparent electrode 112B-1 and the second transparent electrode 112B-2 is $a_1$, and $p_1=a_1+b_1$ is satisfied. In the shape and arrangement of the transparent electrodes as shown in FIG. 11, it is preferable to satisfy $d/p_1 \geq 1$, and it is more preferable to satisfy $d/p_1 \geq 2$. Further, the relationship between the first maximum pitch $p_1$ and the first maximum inter-electrode distance $b_1$ preferably satisfies $p_1/2 \leq b_1$. By satisfying these conditions, the first liquid crystal cell 110 of the optical element 10 according to the present embodiment can control the potentials applied to the first transparent electrode 112B-1 and the second transparent electrode 112B-2 to sufficiently diffuse the transmitted light.

As described above, the optical element 10 according to the present embodiment can control the potential applied to each transparent electrode to control the light distribution of transmitted light. Further, in the optical element 10 according to the present embodiment, since the pitch and the inter-electrode distance between the transparent electrodes are changed, moiré and coloration can be reduced.

Fourth Embodiment

A shape and arrangement of a first transparent electrode 112C-1 and a second transparent electrode 112C-2 different from the shape and arrangement of the transparent electrodes described in the First Embodiment to the Third Embodiment are described with reference to FIG. 12.

Figure 12:
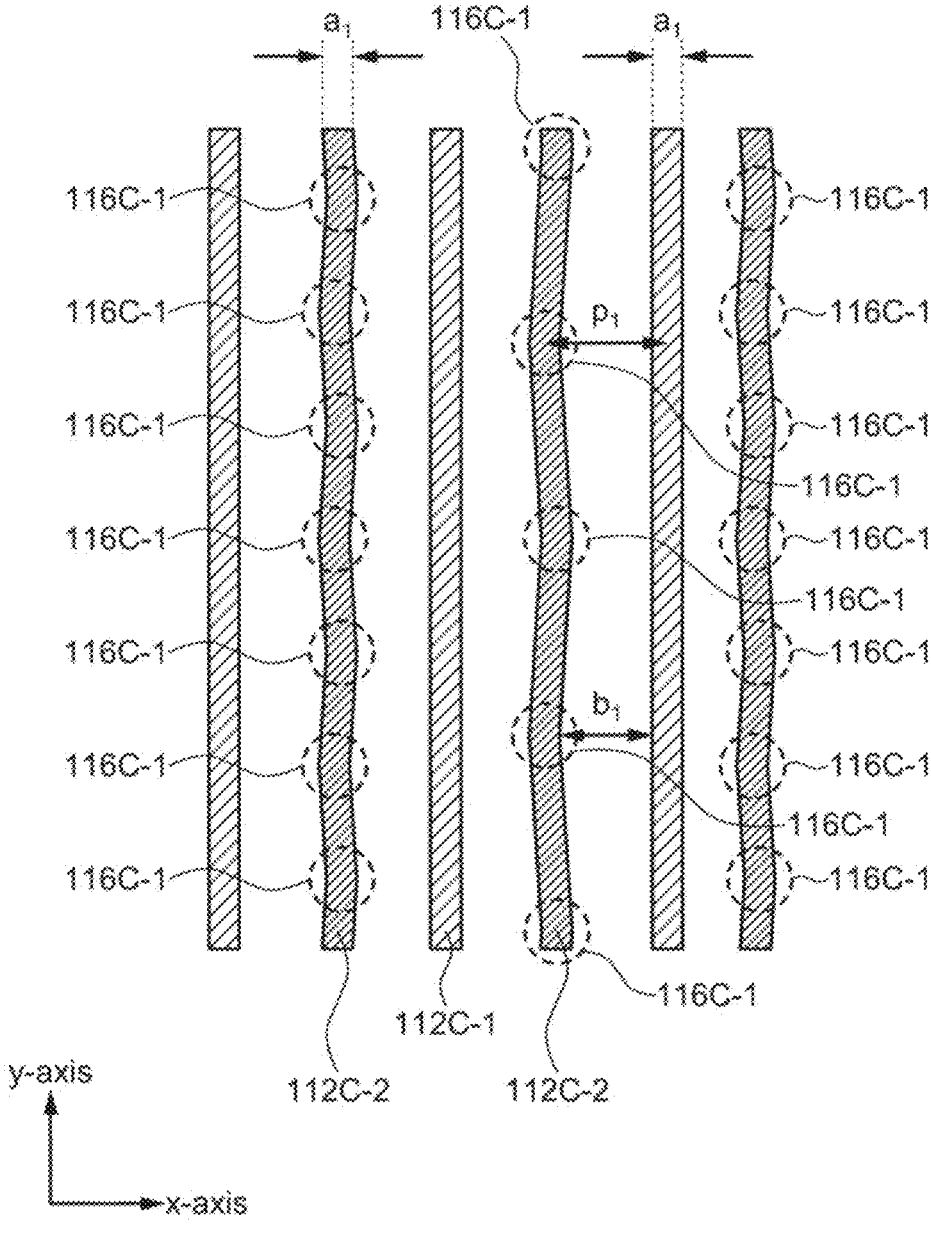
FIG. 12 is a schematic diagram illustrating a shape and a layout of a first transparent electrode and a second transparent electrode of a first liquid crystal cell of an optical element according to an embodiment of the present invention.

FIG. 12 is a schematic diagram illustrating a shape and arrangement of the first transparent electrode 112C-1 and the second transparent electrode 112C-2 of the first liquid crystal cell 110 of the optical element 10 according to an embodiment of the present invention. In the following description, when the configurations of the first transparent electrode 112C-1 and the second transparent electrode 1120-2 are the same as the configurations of the first transparent electrode 112-1 and the second transparent electrode 112-2 described in the First Embodiment, the description of the configurations of the first transparent electrode 112C-1 and the second transparent electrode 112C-2 may be omitted.

As shown in FIG. 12, the first transparent electrode 112C-1 and the second transparent electrode 112C-2 are alternately and repeatedly arranged in the x-axis direction, and each of the first transparent electrode 112C-1 and the second transparent electrode 112C-2 is provided to extend in the y-axis direction. The first transparent electrode 112C-1 is provided in a linear shape in the y-axis direction. On the other hand, the second transparent electrode 112C-2 is provided in a zigzag shape including a plurality of first bent portions 116C-1 bent in the x-axis direction. Therefore, in the optical element 10 according to the present embodiment as well, since the pitch and the inter-electrode distance between the transparent electrodes are changed, moire and coloration can be reduced.

Further, in the shape and arrangement of the transparent electrodes shown in FIG. 12, the two second transparent electrodes 112C-2 adjacent to the first transparent electrode 112C-1 is provided asymmetrically with respect to the extending direction of the first transparent electrode 112C-1. Specifically, the number of the first bent portions 116C-1 is different between the two second transparent electrodes 112C-2 adjacent to the first transparent electrode 112C-1. Therefore, since the symmetry of the arrangement of the transparent electrodes is reduced, moire or coloration can be reduced.

The first transparent electrode 112C-1 and the second transparent electrode 112C-2 have a first maximum pitch $p_1$ and a first maximum inter-electrode distance $b_1$ at one bent portion of the plurality of first bent portions 116C-1. The width of each of the first transparent electrode 112C-1 and the second transparent electrode 112C-2 is $a_1$, and $p_1=a_1+b_1$ is satisfied. In the shape and arrangement of the transparent electrodes as shown in FIG. 12, it is preferable to satisfy $d/p_1 \geq 1$, and it is more preferable to satisfy $d/p_1 \geq 2$. Further, the relationship between the first maximum pitch $p_1$ and the first maximum inter-electrode distance $b_1$ preferably satisfies $p_1/2 \leq b_1$. By satisfying these conditions, the first liquid crystal cell 110 of the optical element 10 according to the present embodiment can control the potentials applied to the first transparent electrode 112C-1 and the second transparent electrode 112C-2 to sufficiently diffuse the transmitted light.

As described above, the optical element 10 according to the present embodiment can control the potential applied to each transparent electrode to control the light distribution of transmitted light. Further, in the optical element 10 according to the present embodiment, since the pitch and the inter-electrode distance between the transparent electrodes are changed, moire and coloration can be reduced.

Fifth Embodiment

A shape and arrangement of a first transparent electrode 112D-1 and a second transparent electrode 112D-2 different from the shape and arrangement of the transparent electrodes described in the First Embodiment to Fourth Embodiment are described with reference to FIG. 13.

Figure 13:
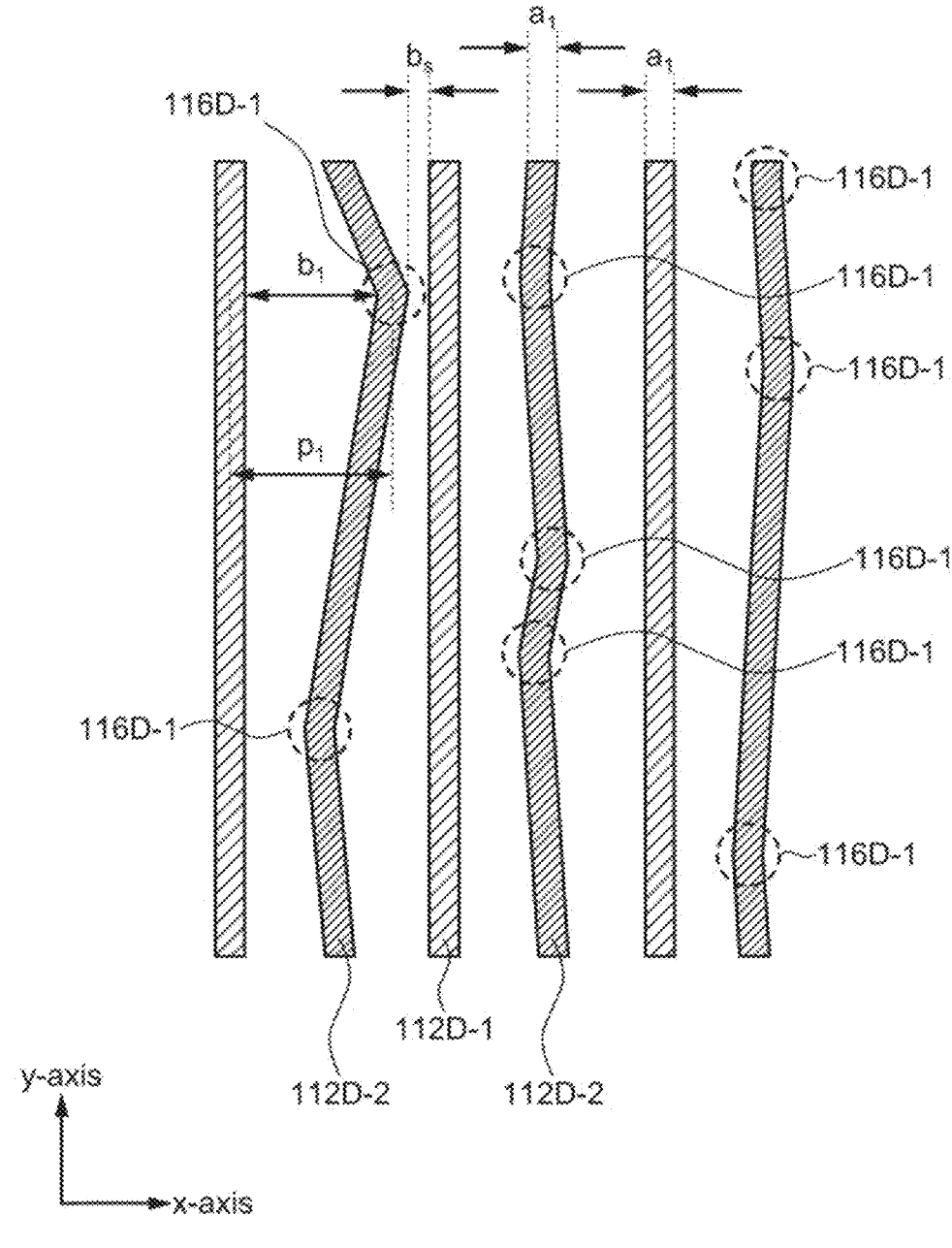
FIG. 13 is a schematic diagram illustrating a shape and a layout of a first transparent electrode and a second transparent electrode of a first liquid crystal cell of an optical element according to an embodiment of the present invention.

FIG. 13 is a schematic diagram illustrating a shape and arrangement of the first transparent electrode 112D-1 and the second transparent electrode 112D-2 of the first liquid crystal cell 110 of the optical element 10 according to an embodiment of the present invention. In the following description, when the configurations of the first transparent electrode 112D-1 and the second transparent electrode 112D-2 are the same as the configurations of the first transparent electrode 112-1 and the second transparent electrode 112-2 described in the First Embodiment, the description of the configurations of the first transparent electrode 112D-1 and the second transparent electrode 112D-2 may be omitted.

As shown in FIG. 13, the first transparent electrode 112D-1 and the second transparent electrode 112D-2 are alternately and repeatedly arranged in the x-axis direction, and each of the first transparent electrode 112D-1 and the second transparent electrode 112D-2 is provided to extend in the y-axis direction. The first transparent electrode 112D-1 is provided in a linear shape in the y-axis direction. On the other hand, the second transparent electrode 112D-2 is provided in a zigzag shape including a plurality of first bent portions 116D-1 bent in the x-axis direction. Therefore, in the optical element 10 according to the present embodiment as well, since the pitch and the inter-electrode distance between the transparent electrodes are changed, moire and coloration can be reduced.

Further, in the shape and arrangement of the transparent electrodes shown in FIG. 13, the two second transparent electrodes 112D-2 adjacent to the first transparent electrode 112D-1 are provided asymmetrically with respect to the extending direction of the first transparent electrode 112D-1. Specifically, the positions of the first bent portions 116D-1 of the second transparent electrode 112D-2 are randomly provided. Therefore, since the symmetry of the arrangement of the transparent electrodes is reduced, moire or coloration can be reduced. Here, the position of the first bent portion 116D-1 in the second transparent electrode 112D-2 is random means that the number and position of the first bent portion 116D-1, and location between the first bent portion 116D and the first transparent electrode 112D-1 adjacent to the first bent portion 116D-1 is different in each of the second transparent electrodes 112D-2. Simply, it means that the second transparent electrodes 112D-2 have different shapes. In this case, although it is preferable that all of the plurality of second transparent electrodes 112D-2 on the first substrate 111-1 have different shapes, a group of adjacent transparent electrodes 112D-2 having different shapes may be repeatedly arranged. The same configuration is adopted to a fourth transparent electrode 112D-4.

When the first bent portion 116D-1 is formed at random, the minimum inter-electrode distance $b_s$ between the first transparent electrode 112D-1 and the second transparent electrode 112D-2 can be set to a predetermined value. For example, the minimum inter-electrode distance $b_s$ may be a value set by the user or a value determined by photolithography or the like.

The first transparent electrode 112D-1 and the second transparent electrode 112D-2 have a first maximum pitch $p_1$ and a first maximum inter-electrode distance $b_1$ at one bent portion of the plurality of first bent portions 116D-1. The width of each of the first transparent electrode 112D-1 and the second transparent electrode 112D-2 is $a_1$, and $p_1=a_1+b_1$ is satisfied. In the shape and arrangement of the transparent electrodes as shown in FIG. 13, it is preferable to satisfy $d/p_1 \geq 1$, and it is more preferable to satisfy $d/p_1 \geq 2$. However, since the minimum inter-electrode distance bs is set in the shape and arrangement shown in FIG. 13, it is necessary to satisfy $p_1 > a_1 + b_s$. Therefore, in the shape and arrangement of the transparent electrodes shown in FIG. 13, it is preferable to satisfy $a_1 + b_s < p_1 \leq d$, and it is more preferable to satisfy $a_1 + b_s < p_1 \leq d/2$.

Further, the relationship between the first maximum pitch $p_1$ and the first maximum inter-electrode distance $b_1$ preferably satisfies $p_1/2 \leq b_1$. By satisfying these conditions, the first liquid crystal cell 110 of the optical element 10 according to the present embodiment can control the potentials applied to the first transparent electrode 112D-1 and the second transparent electrode 112D-2 to sufficiently diffuse the transmitted light.

As described above, the optical element 10 according to the present embodiment can control the potential applied to each transparent electrode to control the light distribution of transmitted light. Further, in the optical element 10 according to the present embodiment, since the pitch and the inter-electrode distance between the transparent electrodes are changed, moiré and coloration can be reduced.

Sixth Embodiment

An arrangement of the transparent electrodes in the stacked structure of the first liquid crystal 110 and the second liquid crystal 120 is described with reference FIG. 14.

Figure 14:
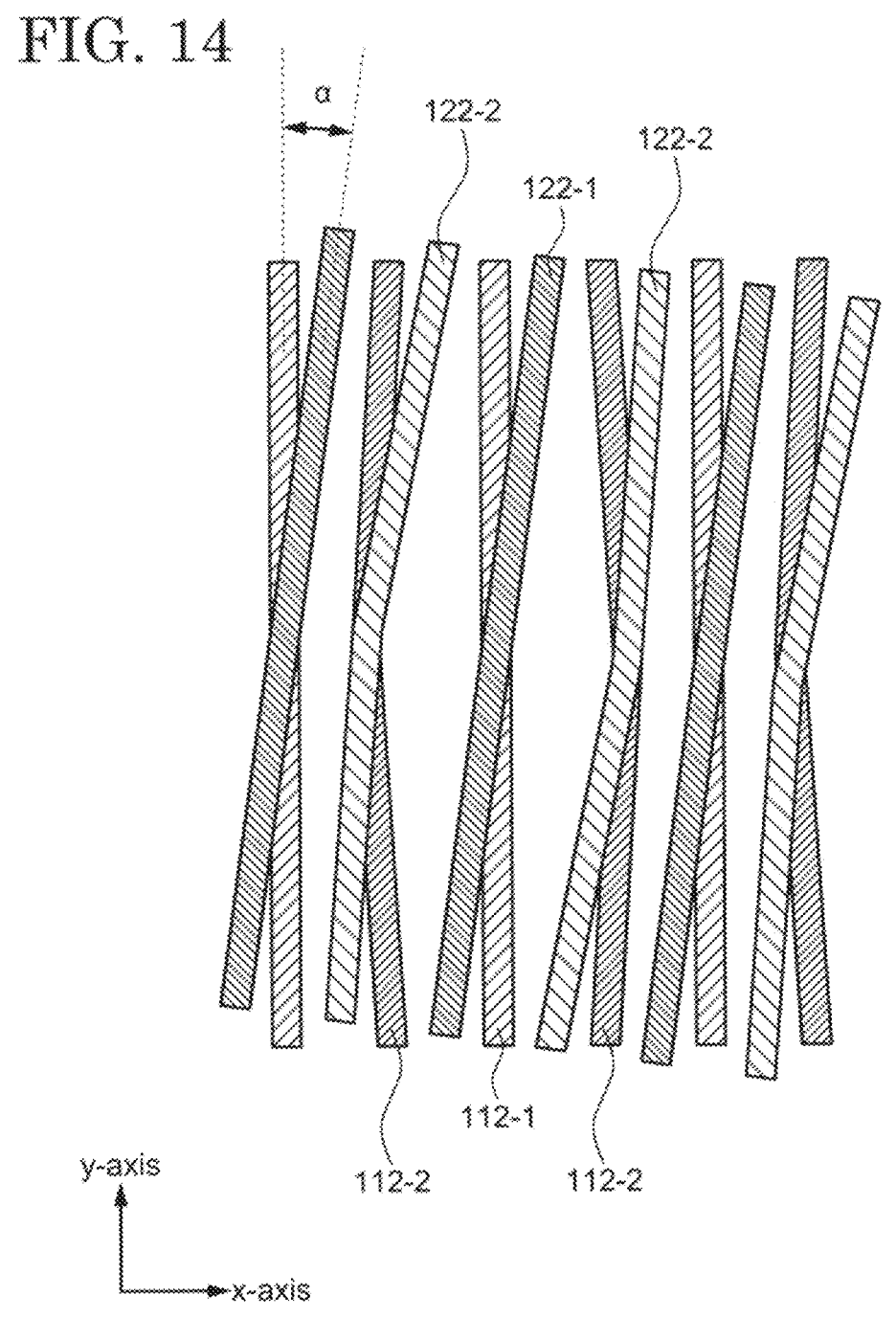

FIG. 14 is a schematic diagram illustrating an arrangement in a stacked structure of the first transparent electrode 112-1 and the second transparent electrode 112-2 of the first liquid crystal cell 110 and the first transparent electrode 122-1 and the second transparent electrode 122-2 of the second liquid crystal cell 120 in the optical element 10 according to an embodiment of the present invention.

In FIG. 14, the first liquid crystal cell 110 and the second liquid crystal cell 120 are not stacked so that the positions of the transparent electrodes match in a plan view. That is, the first liquid crystal cell 110 and the second liquid crystal cell 120 are stacked with an angle $\alpha$ between the extending direction of the first transparent electrode 112-1 of the first liquid crystal cell 110 and the extending direction of the first transparent electrode 122-1 of the second liquid crystal cell 120. For example, the angle $\alpha$ is greater than or equal to 0 degrees and less than or equal to 4 degrees. The extending direction of the transparent electrodes of the first liquid crystal cell 110 is shifted from the extending direction of the transparent electrodes of the second liquid crystal cell 120, so that the symmetry can be reduced. Therefore, moire and coloration can be reduced. In addition, it is preferable that the first bent portion of the first transparent electrode 112-1 of the first liquid crystal cell 110 does not overlap the first bent portion of the first transparent electrode 112-1 of the second liquid crystal cell 120. The same configuration is adopted to the second bent portion. Since the symmetry between the liquid crystal is further reduced, moire and coloration can be further reduced.

As described above, the optical element 10 according to the present embodiment can control the potential applied to each transparent electrode to control the light distribution of transmitted light. Further, since the pitch and the inter-electrode distance between the transparent electrodes in the stacking direction of the liquid crystal cell in the optical element 10 according to the present invention are changed, moire and coloration can be further reduced.

Within the scope of the present invention, those skilled in the art may conceive of examples of changes and modifications, and it is understood that these examples of changes and modifications are also included within the scope of the present invention. For example, additions, deletions, or design changes of constituent elements, or additions, omissions, or changes to conditions of steps as appropriate based on the respective embodiments described above are also included within the scope of the present invention as long as the gist of the present invention is provided.

Further, other effects which differ from those brought about by the embodiment, but which are apparent from the description herein or which can be readily predicted by those skilled in the art, are naturally understood to be brought about by the present invention.

What is claimed is:

1. An optical element comprising:
   at least two liquid crystal cells comprising:
   a first substrate on which a first transparent electrode and a second transparent electrode are alternately and repeatedly arranged in a first direction;
   a second substrate on which a third transparent electrode and a fourth transparent electrode are alternately and repeatedly arranged in a second direction intersecting the first direction; and
   a liquid crystal layer between the first substrate and the second substrate,
   wherein each of the first transparent electrode and the third transparent electrode has a linear shape,
   the second transparent electrode comprises a first bent portion bent in the first direction,
   the fourth transparent electrode comprises a second bent portion bent in the second direction, and
   a pair of second transparent electrodes adjacent to each other through the first transparent electrode are provided line-symmetrically with respect to an extending direction of the first transparent electrode.

2. The optical element according to claim 1, wherein an inter-substrate distance d between the first substrate and the second substrate and a first maximum pitch $p_1$ between the first transparent electrode and the second transparent electrode satisfy $d/p_1 \geq 1$.

3. The optical element according to claim 2, wherein $d/p_1 \geq 2$ is satisfied.

4. The optical element according to claim 2, wherein the first maximum pitch $p_1$ and an inter-electrode distance b1 between the first transparent electrode and the second transparent electrode satisfy $p_1/2 \leq b1$.

5. The optical element according to claim 2, wherein the inter-substrate distance d and a second maximum pitch $p_2$ between the third transparent electrode and the fourth transparent electrode satisfy $d/p_2 \geq 1$.

6. The optical element according to claim 5, wherein $d/p_2 \geq 2$ is satisfied.

7. The optical element according to claim 5, wherein the second maximum pitch $p_2$ and a second maximum inter-electrode distance b2 between the third transparent electrode and the fourth transparent electrode satisfy $p_2/2 \leq b2$.

8. The optical element according to claim 1,
   wherein the at least two liquid crystal cells comprise a first liquid crystal cell and a second liquid crystal cell,
   the first bent portion of the first liquid crystal cell does not overlap the first bent portion of the second liquid crystal cell, and
   the second bent portion of the first liquid crystal cell does not overlap the second bent portion of the second liquid crystal cell.

9. The optical element according to claim 1,
   wherein the at least two liquid crystal cells comprise a first liquid crystal cell and a second liquid crystal cell, and an angle $\alpha$ between an extending direction of the first transparent electrode of the first liquid crystal cell and an extending direction of the first transparent electrode of the second liquid crystal cell is greater than 0 degrees and less than or equal to 4 degrees.

10. An optical element, comprising:

at least two liquid crystal cells comprising:

a first substrate on which a first transparent electrode and a second transparent electrode are alternately and repeatedly arranged in a first direction;

a second substrate on which a third transparent electrode and a fourth transparent electrode are alternately and repeatedly arranged in a second direction intersecting the first direction; and a liquid crystal layer between the first substrate and the second substrate, wherein each of the first transparent electrode and the third transparent electrode has a linear shape, the second transparent electrode comprises a first bent portion bent in the first direction, the fourth transparent electrode comprises a second bent portion bent in the second direction, and a pair of second transparent electrodes adjacent to each other through the first transparent electrode have different numbers of the first bent portions.

11. The optical element according to claim 10, wherein an inter-substrate distance d between the first substrate and the second substrate and a first maximum pitch $p_1$ between the first transparent electrode and the second transparent electrode satisfy $d/p_1 \geq 1$.

12. The optical element according to claim 11, wherein $d/p_1 \geq 2$ is satisfied.

13. The optical element according to claim 11, wherein the first maximum pitch $p_1$ and an inter-electrode distance b1 between the first transparent electrode and the second transparent electrode satisfy $p_1/2 \leq b1$.

14. The optical element according to claim 11, wherein the inter-substrate distance d and a second maximum pitch $p_2$ between the third transparent electrode and the fourth transparent electrode satisfy $d/p_2 \geq 1$.

15. The optical element according to claim 14, wherein $d/p_2 \geq 2$ is satisfied.

16. The optical element according to claim 14, wherein the second maximum pitch $p_2$ and a second maximum inter-electrode distance b2 between the third transparent electrode and the fourth transparent electrode satisfy $p_2/2 \leq b2$.

17. The optical element according to claim 10, wherein the at least two liquid crystal cells comprise a first liquid crystal cell and a second liquid crystal cell, the first bent portion of the first liquid crystal cell does not overlap the first bent portion of the second liquid crystal cell, and the second bent portion of the first liquid crystal cell does not overlap the second bent portion of the second liquid crystal cell.

18. The optical element according to claim 10, wherein the at least two liquid crystal cells comprise a first liquid crystal cell and a second liquid crystal cell, and an angle $\alpha$ between an extending direction of the first transparent electrode of the first liquid crystal cell and an extending direction of the first transparent electrode of the second liquid crystal cell is greater than 0 degrees and less than or equal to 4 degrees.

* * * * *